(12) United States Patent
Jeon

(10) Patent No.: US 10,721,436 B2
(45) Date of Patent: Jul. 21, 2020

(54) METHOD FOR PROVIDING VIDEO CALL SERVICE, ELECTRONIC DEVICE THEREFOR, AND SERVER THEREFOR

(71) Applicant: Wooho Jeon, Sokcho-si (KR)

(72) Inventor: Wooho Jeon, Sokcho-si (KR)

(*) Notice: Subject to any disclaimer, the term of this patent is extended or adjusted under 35 U.S.C. 154(b) by 0 days.

(21) Appl. No.: 16/519,289

(22) Filed: Jul. 23, 2019

(65) Prior Publication Data

US 2020/0036940 A1 Jan. 30, 2020

(30) Foreign Application Priority Data

Jul. 24, 2018 (KR) .......................... 10-2018-0085783

(51) Int. Cl.
*H04N 7/14* (2006.01)
*H04M 3/56* (2006.01)
*H04N 7/15* (2006.01)
*H04N 19/467* (2014.01)
*H04M 15/00* (2006.01)

(52) U.S. Cl.
CPC ............ *H04N 7/147* (2013.01); *H04M 3/567* (2013.01); *H04M 15/64* (2013.01); *H04N 7/152* (2013.01); *H04N 19/467* (2014.11)

(58) Field of Classification Search
CPC combination set(s) only.
See application file for complete search history.

(56) References Cited

U.S. PATENT DOCUMENTS

| | | | |
|---|---|---|---|
| 2011/0225539 A1* | 9/2011 | Lee | H04M 1/27475 715/784 |
| 2016/0088138 A1* | 3/2016 | Karnalkar | H04M 1/72583 455/415 |
| 2016/0191975 A1* | 6/2016 | Ju | H04N 21/41407 725/1 |

FOREIGN PATENT DOCUMENTS

| KR | 1020100039118 A | 4/2010 |
|---|---|---|
| KR | 101877850 B1 | 7/2018 |

* cited by examiner

*Primary Examiner* — Phung-Hoang J Nguyen
(74) *Attorney, Agent, or Firm* — Innovation Capital Law Group, LLP; Vic Lin

(57) ABSTRACT

A method for providing a video call service by a server according to various embodiments may include the operations of: transmitting, to an electronic device, information regarding at least one counterpart user and information regarding whether or not the at least one counterpart user is currently engaged in a video call; receiving a request for a video call to a specific counterpart user, and transmitting the received request for a video call to an external electronic device of the specific counterpart user; receiving a response to the request for a video call from the external electronic device and transmitting the received response to the electronic device; receiving a request for transferring a point related to the video call service to the specific counterpart user while making the video call; and transmitting information regarding the transferred point. Various other embodiments are possible.

6 Claims, 23 Drawing Sheets

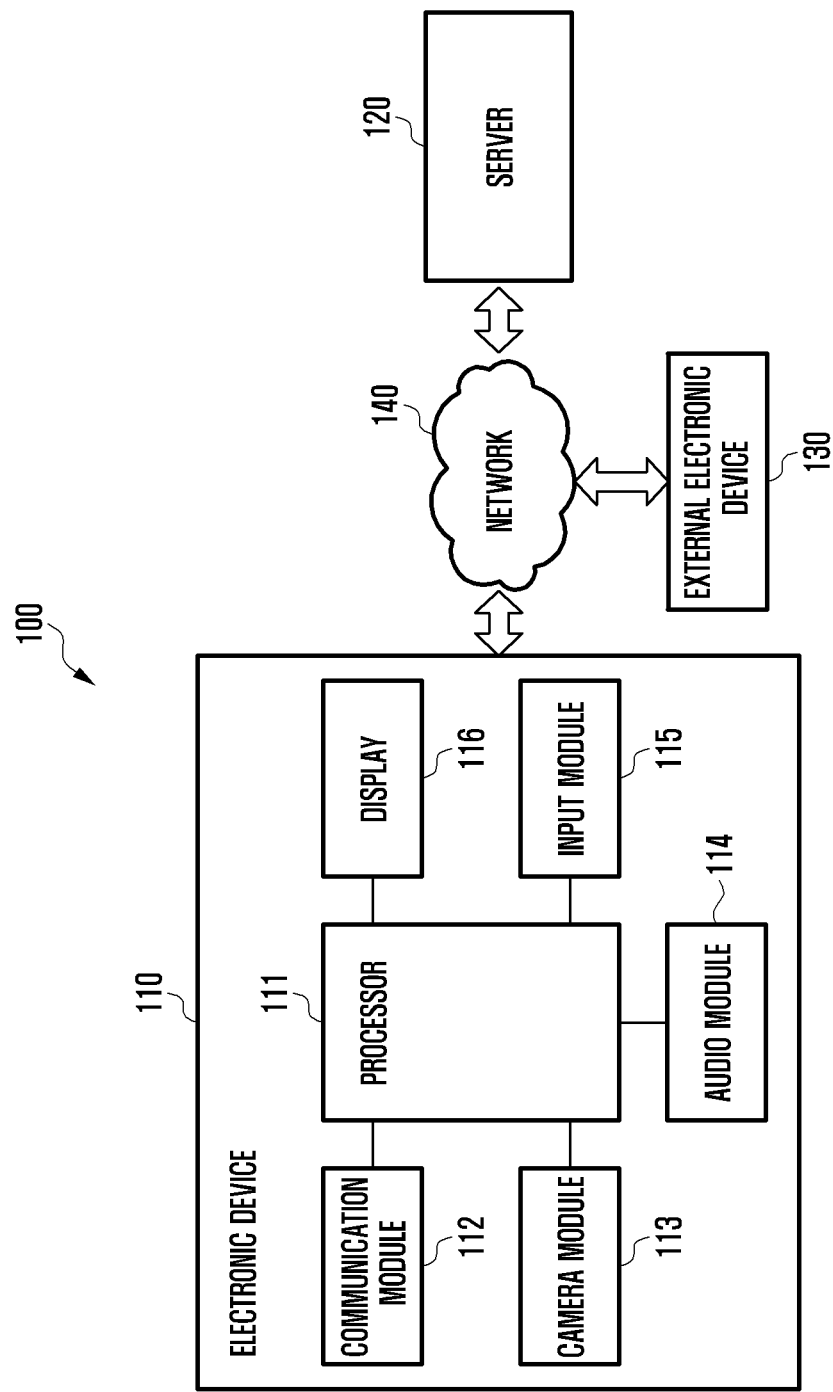

METHOD FOR PROVIDING VIDEO CALL SERVICE, ELECTRONIC DEVICE THEREFOR, AND SERVER THEREFOR

CROSS-REFERENCE TO RELATED APPLICATION(S)

This application is based on and claims priority under 35 U.S.C. 119 to Korean Patent Application No. 10-2018-0085783, filed on Jul. 24, 2018, in the Korean Intellectual Property Office, the disclosure of which is herein incorporated by reference in its entirety.

BACKGROUND

1) Field

Various embodiments relate to a method for providing a video call service, an electronic device therefor, and a server therefor and, for example, to a method for providing a video call service, an electronic device therefor, and a server therefor, wherein an indicator may be displayed on a screen so as to indicate whether or not at least one counterpart user is currently engaged in a video call, a request for a video call may be sent to a counterpart user who is not engaged in a video call, and a response to the video call request may be received from the counterpart user.

2) Description of Related Art

The above information is presented as background information only to assist with an understanding of the disclosure. No determination has been made, and no assertion is made, as to whether any of the above might be applicable as prior art with regard to the disclosure.

In line with recent development of mobile communication technologies, it has become possible to provide a data communication service, which mainly focuses on data communication, as an improvement on conventional services directed to voice calls, and various types of services that utilize such a data communication service have been proposed. For example, a user can view web pages by using an application installed in his/her electronic device, or can make a video call to a counterpart user by using a video call service.

In the case of a conventional video call service, when a user selects the contact number of a counterpart user from a contact list stored in his/her electronic device, the electronic device may send a video call request to the electronic device of the counterpart user, may receive a response to the video call request from the electronic device of the counterpart user, and may determine whether or not to make a video call (for example, see Patent Document 1).

(Patent Document 1) KR 10-2010-0039118 A

SUMMARY

There is a problem in that a user of a conventional video call service can only simply select a counterpart user from a contact list stored in his/her electronic device, he/she cannot make a video call to a counterpart user who is not on the contact list stored in the electronic device, and he/she has difficulty in knowing, prior to making a video call request, whether or not the counterpart user is currently engaged in a video call with another person.

There is another problem in that, if the user stores the screen display of the counterpart user as still or moving images during a video call, in other words, if the user captures or records the video call screen, the privacy of the counterpart user could be infringed.

Moreover, conventional video call services have a problem in that the same provide users with video call functions only, and do not provide various additional functions that can induce users to continuously user the video call services.

Conventional video call services have another problem in that the same cannot recommend appropriate counterpart users to users.

A method for providing a video call service by a server according to various embodiments may include the operations of: transmitting, to an electronic device, information regarding at least one counterpart user and information regarding whether or not the at least one counterpart user is currently engaged in a video call; receiving, from the electronic device, a request for a video call to a specific counterpart user among the at least one counterpart user, and transmitting the received request for a video call to an external electronic device of the specific counterpart user; receiving a response to the request for a video call from the external electronic device and transmitting the received response to the electronic device; receiving, when it is determined to make the video call, a request for transferring a point related to the video call service to the specific counterpart user from the electronic device while making the video call; and transmitting information regarding the transferred point to the external electronic device in response to the received request.

A method for providing a video call service by an electronic device according to various embodiments may include the operations of: outputting a screen, when an application related to the video call service is executed, images corresponding to at least one counterpart user and a first indicator indicating whether or not the counterpart user is currently engaged in a video call; receiving a first user input of selecting one of the images corresponding to at least one counterpart user; transmitting a request for a video call to an external electronic device of a specific counterpart user corresponding to the selected image on the basis of the first user input; receiving a response to the request for a video call; determining whether or not to make a video call on the basis of the received response; receiving a first image from the external electronic device when it is determined to make the video call; acquiring a second image through a camera of the electronic device; receiving a first user input related to transferring a point related to the video call service to the specific counterpart user while the first image and the second image are output; and transmitting a request for transferring the point to a server in response to reception of the first user input.

According to various embodiments, a user may be provided with information that enables easy confirmation regarding whether or not a counterpart user is currently engaged in a video call.

According to various embodiments, it is possible to protect the privacy of a user who uses a video call service.

According to various embodiments, it is possible to provide a user who uses a video call service with various additional functions that can induce continuous service use.

According to various embodiments, it is possible to recommend appropriate counterparts to users who use a video call service.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 1 is a diagram illustrating an exemplary system for providing video call service according to various embodiments;

DETAILED DESCRIPTION

Figure 2A:
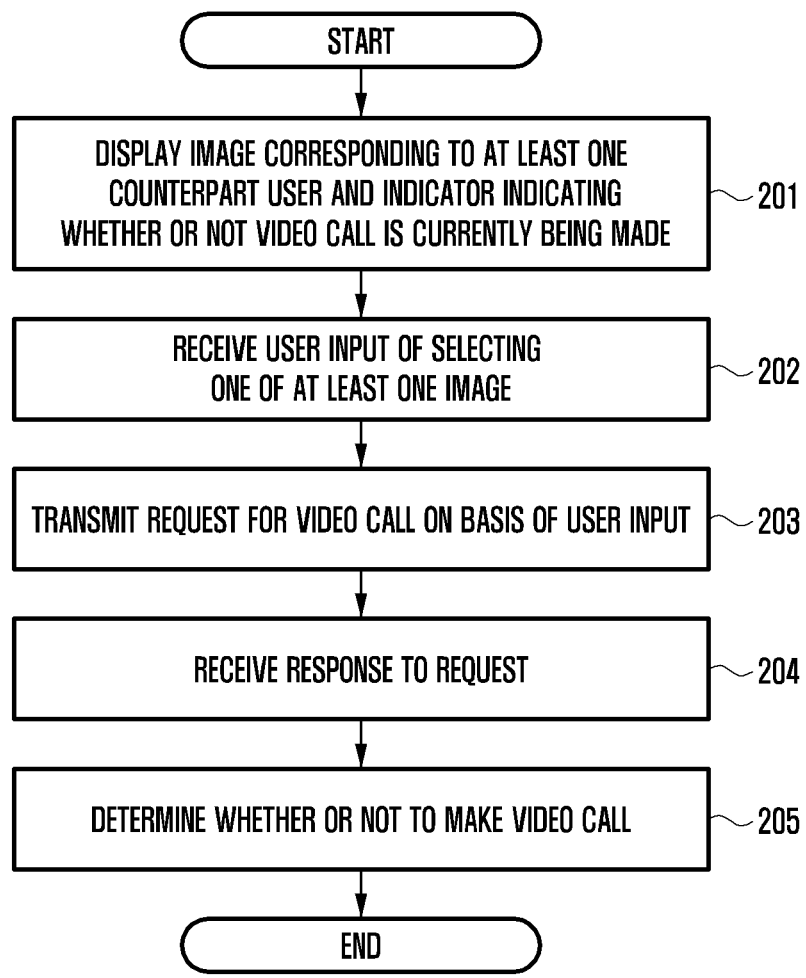
FIG. 2A is a flowchart of a method for providing a video call service performed by an electronic device according to various embodiments.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first", "a second", "the first", or "the second" may modify various components regardless of the order and/or the importance, and is used merely to distinguish one element from any other element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

FIG. 1 is a diagram illustrating an exemplary system 100 for providing video call service according to various embodiments.

According to various embodiments, the system 100 for providing a video call service may include an electronic device 110, a server 120, an external electronic device 130, and a network 140. The external electronic device 130 may be a device of a type identical to or different from that of the electronic device 110, for example. According to an embodiment, all or some of operations performed by the electronic device 110 may be performed by one or multiple external electronic devices.

The electronic device 110 according to various embodiments may include, for example, at least one processor 111, a communication module 112, a camera module 113, an audio module 114, an input module 115, and/or a display 116. According to various embodiments, at least one of the constituent elements of the electronic device 110 may be omitted, or the same may further include another constituent element.

The processor 111 may perform operations or data processing related to control and/or communication of at least one different constituent element of the electronic device 110, for example.

The communication module 112 may, for example, configure communication between the electronic device 110 and an external device (for example, the server 120 or the external electronic device 130). The communication module 112 may be connected to the network 140 through wireless communication or wireless communication, for example, and may communicate with the server 120 and/or the external electronic device 130, which are connected to the network 140. The communication module 112 may transmit commands or data received from at least one constituent element of the electronic device 110, for example, to the server 120 and/or the external electronic device 130. The communication module 112 may receive commands or data from the server 120 and/or the external electronic device 130, for example.

The camera module 113 may take still images and moving images, for example. The camera module 113 may include, for example, at least one sensor, an image sensor, an image signal processor, and/or a flash.

The audio module 114 may conduct conversion between a sound and an electric signal, for example. The audio module 114 may, for example, acquire a sound through a sound input device (for example, a microphone) or output a sound through a sound output device (for example, a speaker or an earphone).

The input module 115 may, for example, receive commands or data from the user and may transfer the received commands or data to other constituent element(s) of the electronic device 110. The input module 115 may include, for example, a mouse, a keyboard, and a touch panel.

The display 116 may, for example, visually provide the user with data received from at least one constituent element of the electronic device 110.

Although not illustrated in the drawings, the electronic device 110 may further include a memory. The memory may include, for example, a volatile memory and/or a nonvolatile memory. The memory may, for example, store commands or data related to at least one different constituent element of the electronic device 110 and may store software and/or programs. The electronic device according to various embodiments may be various types of devices.

The electronic device 110 may include, for example, a portable communication device (for example, a smartphone), a computer device, and a portable multimedia device, and the electronic device 110 according to embodiments is not limited to the above-mentioned devices.

FIG. 2A is a flowchart of a method for providing a video call service performed by an electronic device 110 according to various embodiments.

According to various embodiments, the electronic device 101 may output, in operation 201, an application screen that displays a user image corresponding to at least one counterpart user and a call indicator indicating whether or not the counterpart user is currently engaged in a video call, through a display 116. If the electronic device 110 receives a user input for executing an application related to a video call service, for example, through an input module 115, the electronic device 110 may output an application screen related to the video call service through the display 116. The electronic device 110 may display a call indicator so as to correspond to each of at least one user image, respectively, for example. The electronic device 110 may display a user image of at least one counterpart user, who is currently engaged in a video call, and a call indicator in an overlay type.

According to various embodiments, the electronic device 110 may receive, in operation 202, a user input of selecting one of at least one user image displayed on the application screen related to the video call service.

When the user selects one of the at least one user image, for example, the electronic device 110 may output information regarding the counterpart user corresponding to the user image selected by the user, through the display 116. For example, the electronic device 110 may display a pop-up screen that displays information regarding the counterpart user corresponding to the user image selected by the user, through the display 116. For example, the electronic device 110 may display the pop-up screen that displays information regarding the counterpart user in an area of the application screen related to the video call service. For example, when multiple screens can be output as multiple layers, the electronic device 110 may display the pop-up screen that displays information regarding the counterpart user as a foreground layer, and may display the application screen related to the video call service as a background layer. The pop-up screen that displays information regarding the counterpart user may display, for example, an image corresponding to the counterpart user and personal information of the counterpart user (for example, gender, age, and nationality).

When the user selects a user image corresponding to a counterpart user who is currently engaged in a video call, for example, the electronic device 110 may output information indicating that it is currently impossible to send a video call request to the counterpart user. The electronic device 110 may display information indicating that it is currently impossible to send a video call request to the counterpart user in an area of the pop-up screen, for example.

According to various embodiments, the electronic device 110 may transmit, in operation 203, a request for a video call to the electronic device of the counterpart user corresponding to the user image selected by user, on the basis of the user input received in operation 202. If the electronic device 110 receives a user input that request a video call by selecting a user image corresponding to a counterpart user who is not engaged in a video call, for example, the electronic device 110 may transmit the request for a video call to the electronic device of the counterpart user. The electronic device 110 may transmit the request for a video call to the server 120, for example, and may request the server 120 to transfer the request for a video call to the electronic device of the counterpart user (for example, the external electronic device 130).

According to various embodiments, the electronic device 110 may receive a response to the request for a video call in operation 204. The electronic device 110 may receive a response to the request for a video call from the server 120, for example.

According to various embodiments, the electronic device 110 may determine, in operation 205, whether or not to make a video call on the basis of the response to the request for a video call received in operation 204. If a response that accepts the request for a video call is received, for example, the electronic device 110 may make a video call to the electronic device (for example, the external electronic device 130) of the counterpart user corresponding to the user image selected by the user.

When making a video call, for example, the electronic device 110 may acquire an image related to the user through the camera module 113, and may transmit the acquired image to the electronic device (for example, the external electronic device 130) of the counterpart user through the communication module 112. When making a video call, for example, the electronic device 110 may receive an image related to the counterpart user from the electronic device (for example, the external electronic device 130) of the counterpart user through the communication module 112, and may output the received image related to the counterpart user through the display 116. The electronic device 110 may display, for example, the image related to the user and the image related to the counterpart user on a single screen. The electronic device 110 may conduct a control, for example, such that one of the image related to the user and the image related to the counterpart user is displayed on the full screen, and the other of the image related to the user and the image related to the counterpart user is displayed in a partial area of the full screen. In this case, the electronic device 110 may switch the image displayed on the full screen and the image displayed in a partial area of the full screen on the basis of a user input, for example.

When making a video call, for example, the electronic device 110 may acquire a sound related to the user through the sound input device included in the audio module 114, and may transmit data regarding the sound related to the user to the electronic device (for example, the external electronic device 130) of the counterpart user through the communication module 112. The electronic device 110 may receive data regarding a sound related to the counterpart user from the electronic device (for example, the external electronic device 130) of the counterpart user through the communication module 112, for example, and may output the sound related to the counterpart user through the sound output device included in the audio module 114.

When a user input related to a function for acquiring an image of the screen output through the display 116 (capture function) is received, for example, the electronic device 110 may output a warning message, without performing the capture function, so as to indicate that it is impossible to perform the capture function. The electronic device 110 may output a warning message through the display 116, for example, or may output a sound corresponding to the warming message through the audio module 114.

The electronic device 110 may insert a watermark to a part of the image related to the counterpart user output through the display 116 while making a video call, for example, or to a part of the area in which the user is displayed. The watermark may be a visible watermark, for example. The electronic device 110 may display the image, which is output through the display 116, and the visible watermark in an overlay type, for example. When the visible watermark is inserted, the visible watermark may be inserted into the area in which the image related to the counterpart user is displayed, for example. The visible watermark may, for example, include information regarding the user (for example, the user's name, ID, or nickname). The visible watermark may be output so as to continuously move in the area in which the image is displayed.

Figure 2B:
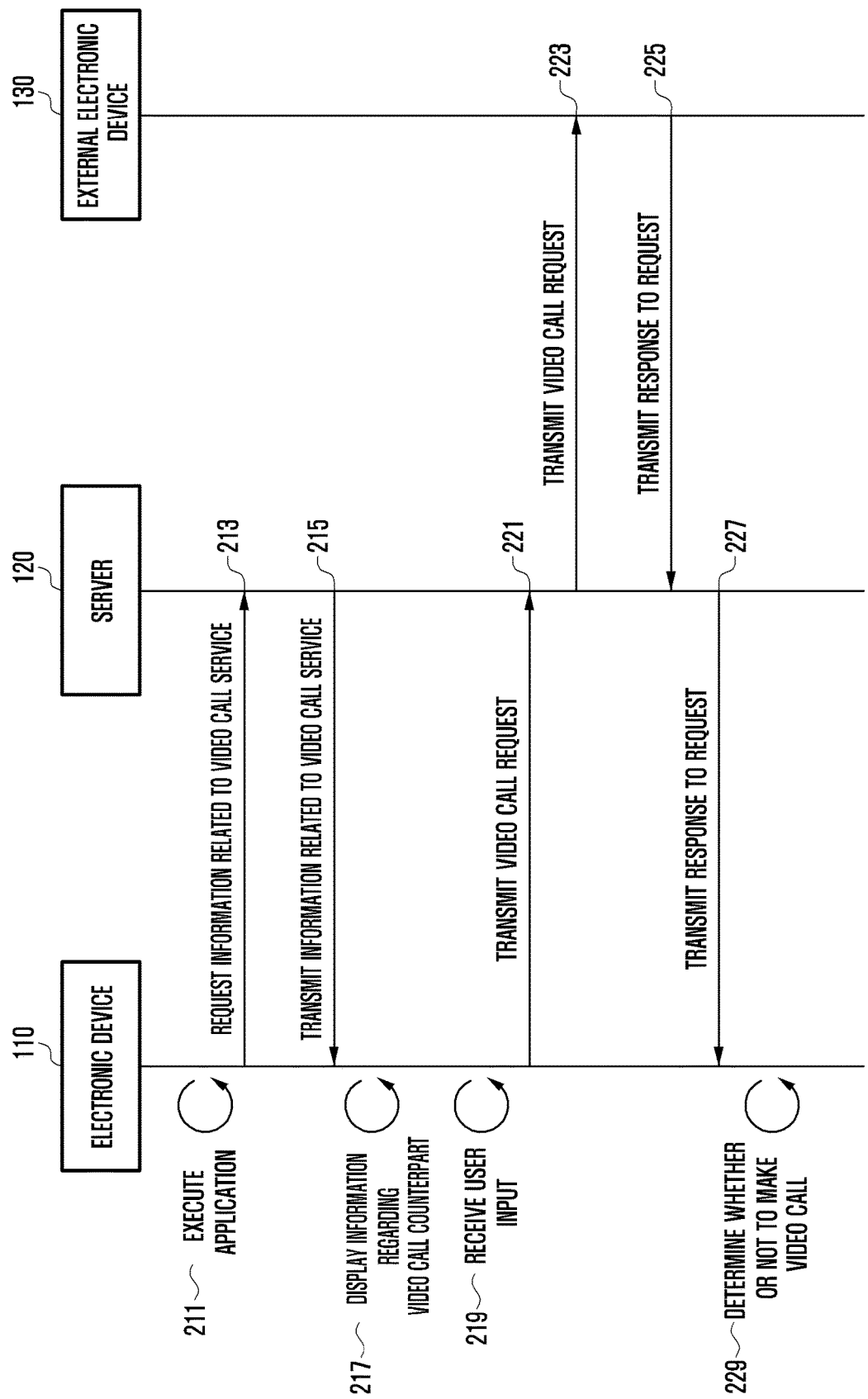
FIG. 2B is a flowchart of a method for providing a video call service performed by a system according to various embodiments.

FIG. 2B is a flowchart of a method for providing a video call service performed by a system 100 according to various embodiments.

According to various embodiments, an electronic device 110 may execute an application related to a video call service in operation 211. The electronic device 110 may execute an application related to a video call service on the basis of a user input received through an input module 115, for example, and may output an application screen related to the video call service through a display 116.

According to various embodiments, the electronic device 110 may request a server 120 to transmit information related to the video call service in operation 213.

The electronic device 110 may request the server 120 to transmit information regarding the user, for example. The information regarding the user may include, for example, a user image corresponding to the user; the user's personal information (for example, gender, age, and nationality); information regarding functions of the video call service (for example, the user's buddy list, history information regarding use of the video call service, and point information regarding use of the video call service); an introductory comment configured by the user; a statistic material regarding the video time for which the user made video calls (for example, information regarding the average video time for which the user made video calls on average, and information regarding the number of times of video calls are made with regard to each classified time period); and a statistic material regarding video scores that reflect evaluation by counterpart users who made video calls to the user in the past (for example, the average video score for each preconfigured item, and the entire average video score). The user's buddy list may refer to a list for storing information regarding at least one counterpart user, for example. The video scores may be calculated on the basis of direct evaluation, after video calls are over, with regard to respective items by other users who made video calls to the counterpart user in the past.

The electronic device 110 may request the server 120 to transmit information regarding at least one counterpart user, for example. The information regarding the counterpart user may include, for example, a user image corresponding to the counterpart user; information regarding whether or not the counterpart user is currently engaged in a video call; the counterpart user's personal information (for example, gender, age, and nationality); an introductory comment configured by the counterpart user; a statistic material regarding the video time for which the counterpart user made video calls; and a statistic material regarding video scores that reflect evaluation by other users who made video calls to the counterpart user in the past.

According to various embodiments, the server 120 may transmit information regarding the video call service to the electronic device 110 in operation 215.

According to various embodiments, the electronic device 110 may output an application screen related to the video call service, which outputs information regarding at least one counterpart user, in operation 217. The electronic device 110 may output an application screen, for example, which outputs a user image corresponding to at least one counterpart user and a call indicator indicating whether or not the counterpart user is currently engaged in a video call. The electronic device 110 may display the call indicator so as to correspond to each of at least one user image, for example. The electronic device 110 may display a user image of at least one counterpart user, who is currently engaged in a video call, and a call indicator in an overlay type, for example.

According to various embodiments, the electronic device 110 may receive a user input of selecting one of at least one user image displayed on the application screen related to the video call service in operation 219.

If the user selects one of the at least one user image, for example, the electronic device 110 may output information regarding the counterpart user corresponding to the user image selected by the user through the display 116. For example, the electronic device 110 may display a pop-up screen that displays information regarding the counterpart user corresponding to the user image selected by the user through the display 116. For example, the electronic device 110 may display the pop-up screen that displays information regarding the counterpart user in an area of the application screen related to the video call service. For example, when multiple screens can be output as multiple layers, the electronic device 110 may display the pop-up screen that displays information regarding the counterpart user as a foreground layer, and may display the application screen related to the video call service as a background layer.

When the user selects a user image corresponding to a counterpart user who is currently engaged in a video call, for example, the electronic device 110 may output information indicating that it is currently impossible to send a video call request to the counterpart user. The electronic device 110 may display information indicating that it is currently impossible to send a video call request to the counterpart user in an area of the pop-up screen, for example.

Although not illustrated specifically in the drawings, the electronic device 110 may store information regarding a counterpart user corresponding to a user image selected by the user, for example, in the user's buddy list. The electronic device 110 may store the user's buddy list in the memory, for example. The electronic device 110 may transmit the user's buddy list to the server 120, for example. The electronic device 110 may display information, on the screen, indicating whether or not at least one counterpart user included in the user's buddy list is currently engaged in a video call, for example. If at least one counterpart user included in the user's buddy list is currently available for a video call, for example, the server 120 may transmit information, to the electronic device 110, information indicating that at least one counterpart user included in the user's buddy list is currently available for a video call. For example, if at least one counterpart user included in the user's buddy list is logged into the video call service and is not engaged in a video call, the server 120 may determine that the at least one counterpart user included in the user's buddy list is currently available for a video call. If at least one counterpart user included in the user's buddy list is logging into the video call service, for example, the server 120 may transmit information, to the electronic device 110, indicating that the at least one counterpart user included in the user's buddy list is logged in. If the electronic device 110 receives, from the server 120, information indicating that at least one counterpart user included in the user's buddy list is currently available for a video call and/or information indicating that at least one counterpart user included in the user's buddy list is logged in, for example, the electronic device 110 may output a message corresponding to the received information through the display 116.

According to various embodiments, the electronic device 110 may transmit, in operation 221, a request for a video call to the server 120 on the basis of the user input received in operation 219. If the electronic device 110 receives a user input that requests a video call by selecting a user image corresponding to a counterpart user who is not engaged in a video call, for example, the electronic device 110 may transmit a request for a video call to the server 120, and may request the server 120 to transfer the request for a video call to the electronic device (for example, the external electronic device 130) of the counterpart user.

According to various embodiments, the server 120 may transmit, in operation 223, the request for a video call received from the electronic device 110 in operation 221 to the electronic device (the external electronic device 130) of the counterpart user.

According to various embodiments, the external electronic device 130 may transmit a response to the request for a video call to the server 120 in operation 225. The external electronic device 130 may receive an input related to a response to the request for a video call from the counterpart user, for example, and may transmit a response to the request for a video call to the server 120 on the basis of the received input.

According to various embodiments, the server 120 may transmit the response to the request for a video call, which has been received from the external electronic device 130 in operation 225, to the electronic device 110 in operation 227.

The electronic device 110 may execute an application related to the video call service as a background process, for example. In this case, a request for a video call may be received while the application related to the video call service is executed as a background process and, if a request for a video call is received, a notification corresponding to reception of the request for a video call may be provided. For example, the method for providing the notification may include at least one method selected from a message display method, a sound output method, and a vibration output method.

According to various embodiments, the electronic device 110 may determine, in operation 229, whether or not to make a video call on the basis of the response to the request for a video call, which has been received from the server 120 in operation 227.

If a response that accepts the request for a video call is received from the server 120, for example, the electronic device 110 may make a video call to the electronic device (the external electronic device 130) of the counterpart user corresponding to the user image selected by the user. For example, the electronic device 110 may make a video call to the external electronic device 130 by using the server 120.

When making a video call, for example, the electronic device 110 may acquire an image related to the user through the camera module 113, and may transmit the image related to the user to the electronic device (the external electronic device 130) of the counterpart user through the communication module 112. When making a video call, for example, the electronic device 110 may receive an image related to the counterpart user from the external electronic device 130, and may output the received image related to the counterpart user. The electronic device 110 may display, for example, the image related to the user and the image related to the counterpart user on a single screen. The electronic device 110 may conduct a control, for example, such that one of the image related to the user and the image related to the counterpart user is displayed on the full screen, and the other of the image related to the user and the image related to the counterpart user is displayed in a partial area of the full screen. In this case, the electronic device 110 may switch the image displayed on the full screen and the image displayed in a partial area of the full screen on the basis of a user input, for example. The electronic device 110 may transmit the image related to the user to the external electronic device 130 through the server 120, for example, and may receive the image related to the counterpart user from the external electronic device 130 through the server 120.

When making a video call, for example, the electronic device 110 may acquire a sound related to the user through the sound input device included in the audio module 114, and may transmit data regarding the sound related to the user to the electronic device (the external electronic device 130) of the counterpart user through the communication module 112. The electronic device 110 may receive data regarding a sound related to the counterpart user from the external electronic device 130 through the communication module 112, for example, and may output the sound related to the counterpart user through the sound output device included in the audio module 114. The electronic device 110 may transmit data regarding the sound related to the user to the external electronic device 130 through the server 120, for example, and may receive data regarding the sound related to the counterpart user from the external electronic device 130 through the server 120.

The electronic device 110 may transfer a point related to the video call service to the counterpart user while making a video call to the external electronic device 130, for example. The electronic device 110 may receive a user input related to transfer of the point related to the video call service to the counterpart user while making a video call. The electronic device 110 may transmit a request for transferring the point to the server 120 in response to reception of the user input.

The server 120 may receive a request for transferring the point related to the video call service to the counterpart user from the electronic device 110, for example. The server 120 may transfer the point to the external electronic device 130 in response to the request for transferring the point, for example.

Figure 3:
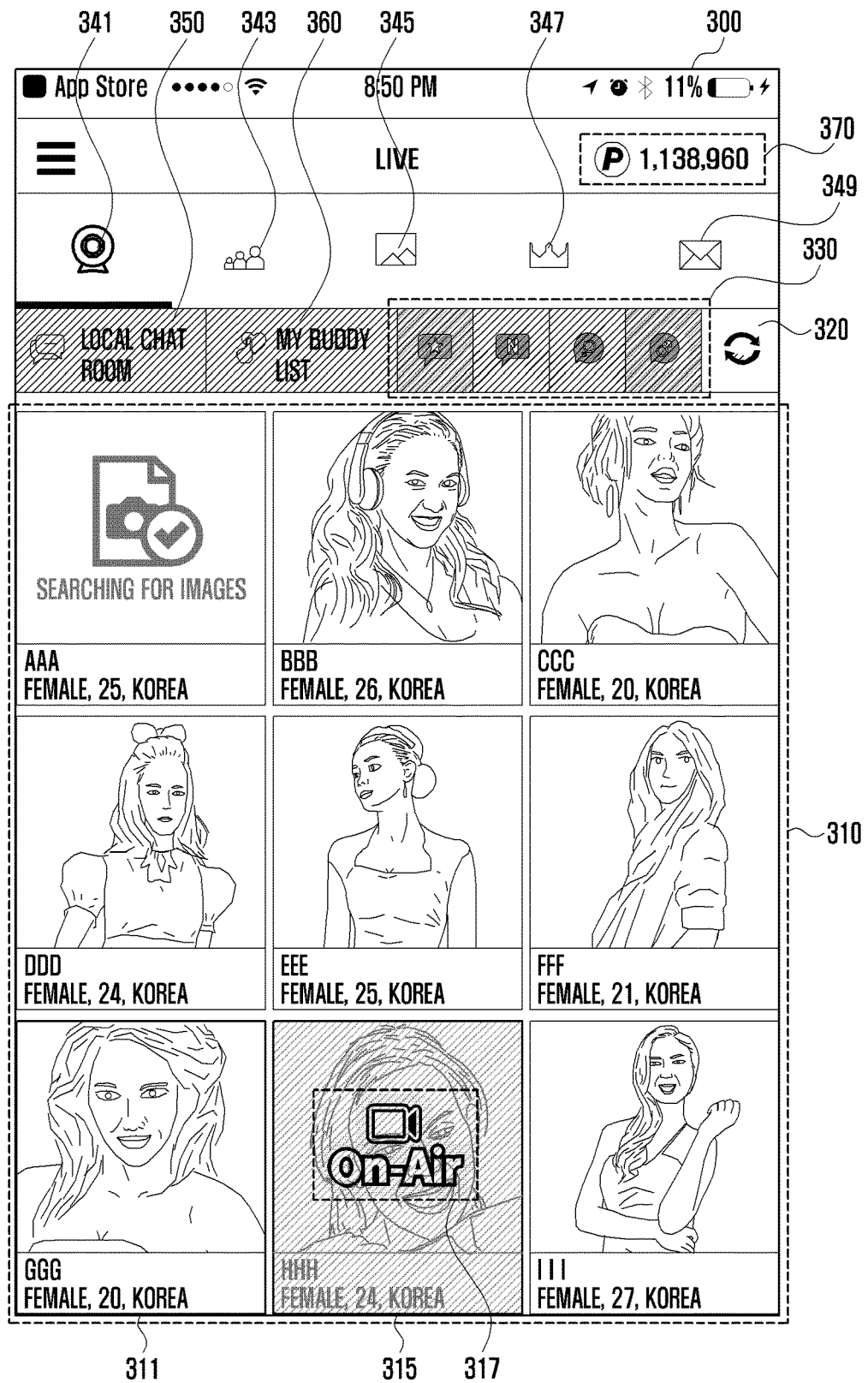
FIG. 3 is a diagram illustrating an exemplary application screen related to a video call service according to various embodiments.

FIG. 3 is a diagram illustrating an exemplary application screen 300 related to a video call service according to various embodiments.

Referring to FIG. 3, the electronic device 110 may conduct a control, for example, such that a user image corresponding to at least one counterpart user is displayed in one area 310 of an application screen 300 related to the video call service, for example.

The electronic device 110 may display a preconfigured image 313 with regard to a counterpart user, whose user image has not been received from the server 120, for example. The electronic device 110 may display a user image 315 of at least one counterpart user who is currently engaged in a video call and a call indicator 317 in an overlay type, for example. The electronic device 110 may receive a user input of selecting one 311 of at least one user image displayed on the application screen 300 related to the video call service, for example.

The electronic device 110 may provide, for example, user interfaces (UIs) 320 and 330 related to changing a user image corresponding to at least one counterpart user displayed in one area 310 of the application screen 300 related to the video call service. For example, the electronic device 110 may receive a user input of selecting a UI 320 related to updating at least one counterpart user. For example, the electronic device 110 may receive a user input of selecting one from a UI for displaying user images according to the ranking of at least one counterpart user, a UI for displaying user images according to the login order of at least one counterpart user, and a UI for displaying user images according to the gender of at least one counterpart user. If the electronic device 110 receives a user input of selecting at least one of the UIs 320 and 330, for example, the electronic device 110 may request the server 120 to transmit information regarding at least one counterpart user, and may display user images on the basis of the information regarding at least one counterpart user received from the server 120.

The electronic device 110 may provide a user interface 350 related to changing user images corresponding to at least one counterpart user displayed in one area of the application screen 300 related to the video call service, for example. The electronic device 110 may provide a UI 360 related to the user's buddy list through the application screen 300 related to the video call service, for example.

The electronic device 110 may provide information regarding points related to use of the video call service through one area 310 of the application screen 300 related to the video call service, for example.

The electronic device 110 may provide a UI 343 related to a recommended counterpart user list through the application screen 300 related to the video call service, for example. The electronic device 110 may provide a UI 345 related to photographs uploaded by at least one counterpart user through the application screen 300 related to the video call service, for example. The electronic device 110 may provide a UI 347 for displaying user images according to video scores of at least one counterpart user through the application screen 300 related to the video call service, for example. The electronic device 110 may provide a UI 349 for displaying messages exchanged with at least one counterpart user through the application screen 300 related to the video call service, for example.

Figure 4A:
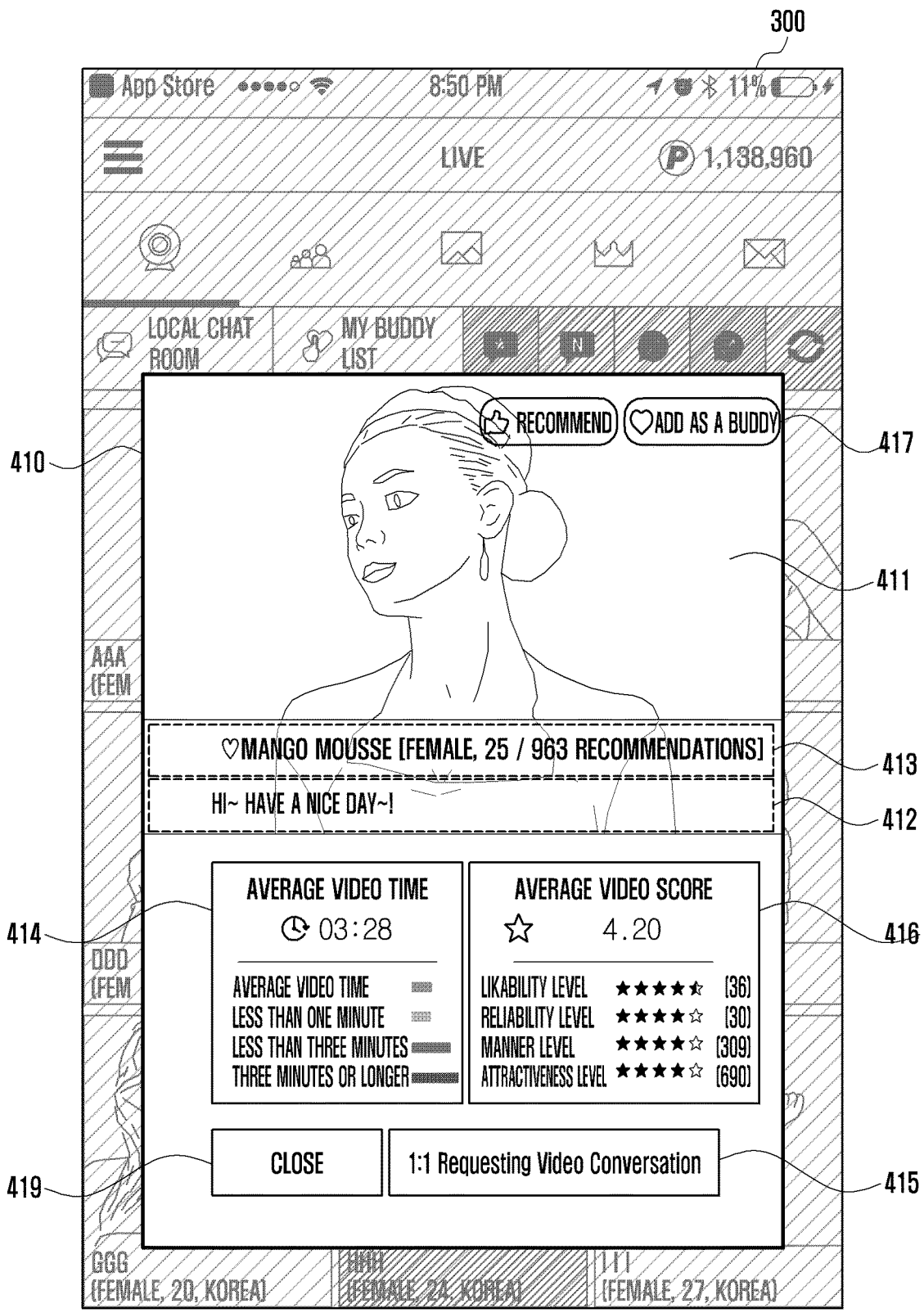
FIG. 4A is a diagram illustrating an example of sending a video call request to a counterpart user according to various embodiments.
Figure 4B:
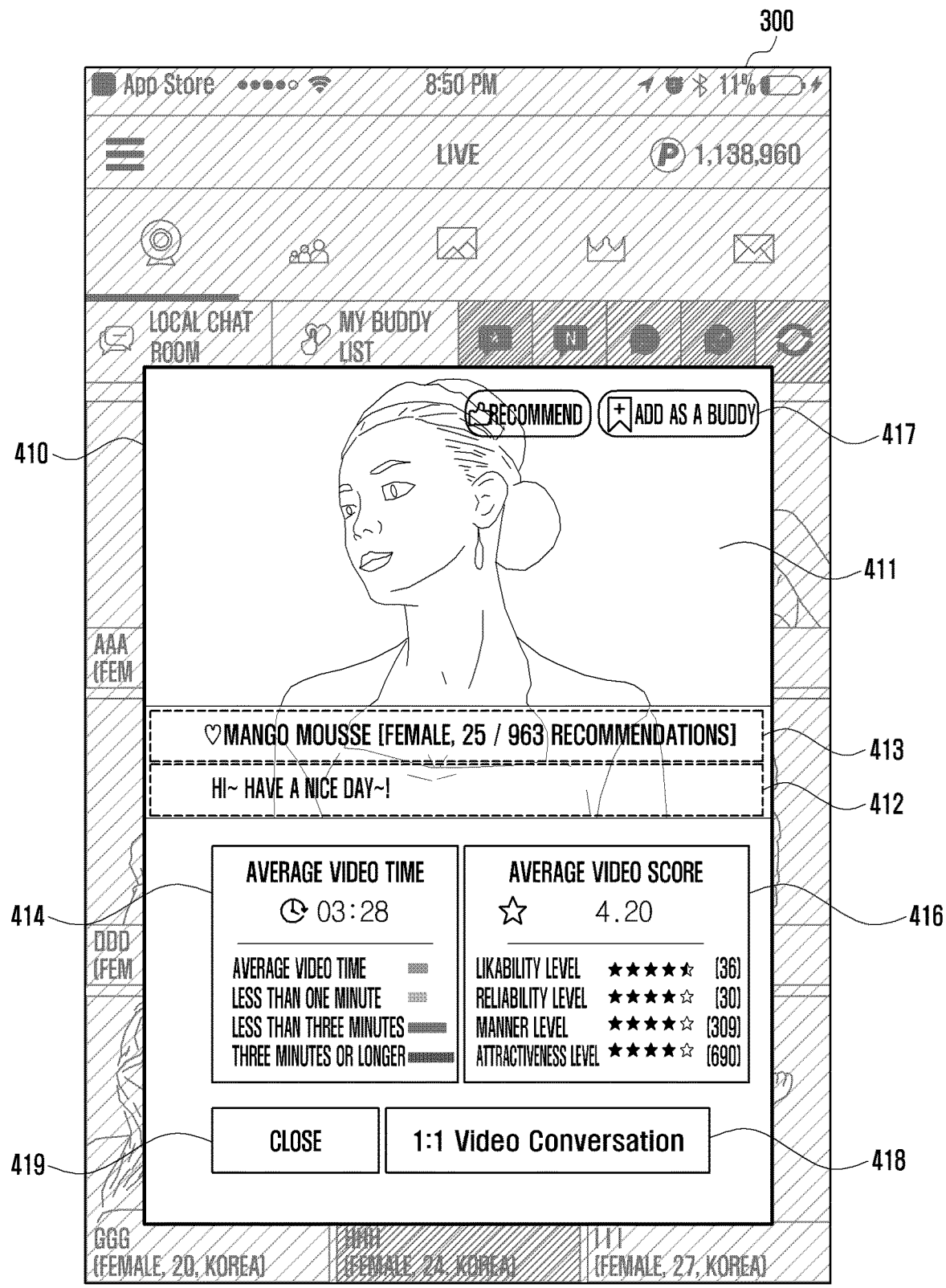
FIG. 4B is a diagram illustrating an example of sending a video call request to a counterpart user according to various embodiments.
Figure 4C:
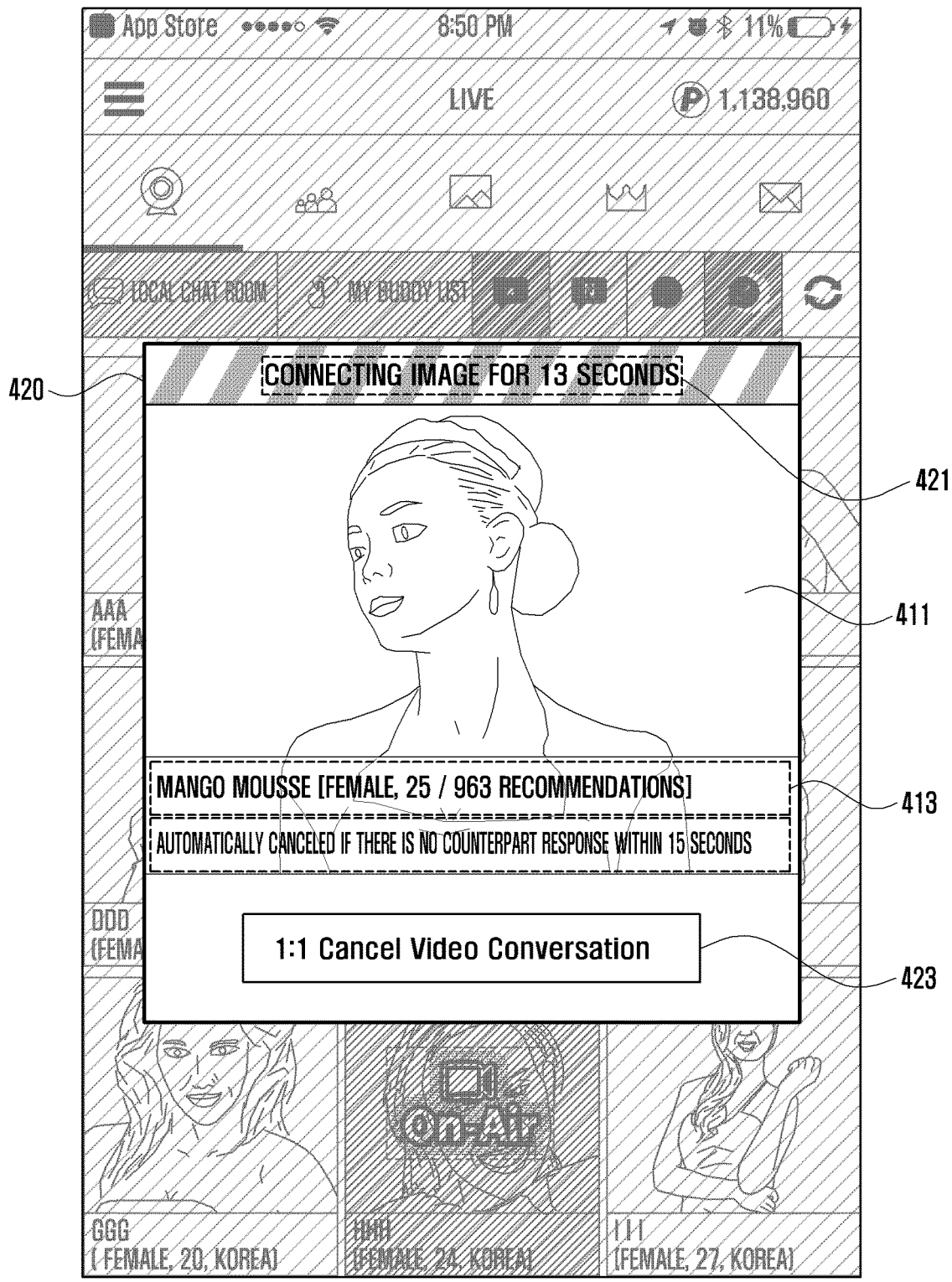
FIG. 4C is a diagram illustrating an example of sending a video call request to a counterpart user according to various embodiments.

FIG. 4A is a diagram illustrating an example of sending a video call request to a counterpart user according to various embodiments, FIG. 4B is a diagram illustrating an example of sending a video call request to a counterpart user according to various embodiments, and FIG. 4C is a diagram illustrating an example of sending a video call request to a counterpart user according to various embodiments.

Referring to FIG. 4A, if the user selects one of at least one user image, the electronic device 110 may output a pop-up screen 410 that display information regarding the counterpart user corresponding to the user image selected by the user. For example, the electronic device 110 may display a pop-up screen 410 that displays information regarding the counterpart user corresponding to the user image selected by the user as a foreground layer, and may display an application screen 300 related to the video call service as a background layer.

The pop-up screen 410 that displays information regarding the counterpart user corresponding to the user image selected by the user may display, for example, the user image 411 selected by the user and the counterpart user's information (for example, gender, age, and nationality) 413. The pop-up screen 410 that displays information regarding the counterpart user corresponding to the user image selected by the user may display, for example, an introductory comment 412 configured by the counterpart user. The pop-up screen 410 that displays information regarding the counterpart user corresponding to the user image selected by the user may display, for example, a statistical material 414 regarding the video time for which the counterpart user made video calls in the past. The statistical material 414 regarding the video time for which the counterpart user made video calls in the past may include, for example, information regarding the average video time for which the user made video calls on average, and information regarding the number of times video calls were made with regard to each classified time period. The pop-up screen 410 that displays information regarding the counterpart user corresponding to the user image selected by the user may display, for example, a statistic material 416 regarding video scores that reflect evaluation by other users who made video calls to the counterpart user in the past. The statistic material 416 regarding video scores that reflect evaluation by other users who made video calls to the counterpart user in the past may include the average video score with regard to each preconfigured item, and the entire average video score. The average video score with regard to each preconfigured item may be calculated by using video scores that reflect direct evaluation, after video calls are over, with regard to respective items by other users who made video calls to the counterpart user in the past, for example.

When the electronic device 110 made a video call, for example, the server 120 may receive information regarding the video time for which the video call was made from the electronic device 110. The server 120 may accumulate and store the received information regarding the video time in connection with the user's profile. The server 120 may store the accumulated video time with regard to each user, and may calculate information regarding the average video time for which each user made video calls on average and information regarding the number of times video calls are made with regard to each classified time period, by using the stored information regarding the video time. The server 120 may transmit the calculated information regarding the average video time and information regarding the number of times video calls were made with regard to each classified time period, to the electronic device 110.

The pop-up screen 410 that displays information regarding the counterpart user corresponding to the user image selected by the user may display, for example, a UI 415 for sending a video call request to the counterpart user, a UI 417 for storing the counterpart user's information on the user's buddy list, and a UI 419 for ending output of the pop-up screen 410 that displays information regarding the counterpart user corresponding to the user image selected by the user, for example.

Referring to FIG. 4B, if the counterpart user corresponding to the user image selected by the user is currently engaged in a video call with another user, the electronic device 110 my provide a UI 418 indicating that the counterpart user is currently engaged in a video call.

Referring to FIG. 4C, if the electronic device 110 receives a user input of selecting the UI 415 for sending a video call request to the counterpart user, the electronic device 110 may transmit the request for a video call to the electronic device of the counterpart user. If the electronic device 110 receives a user input of selecting the UI 415 for sending a video call request to the counterpart user, the electronic device 110 may display information 421 indicating that a request for a video call is currently being made, through a pop-up screen 420 related to the video call request. The pop-up screen 420 related to the video call request may provide a UI 423 for ending the request for a video call to the counterpart user, for example.

Figure 4D:
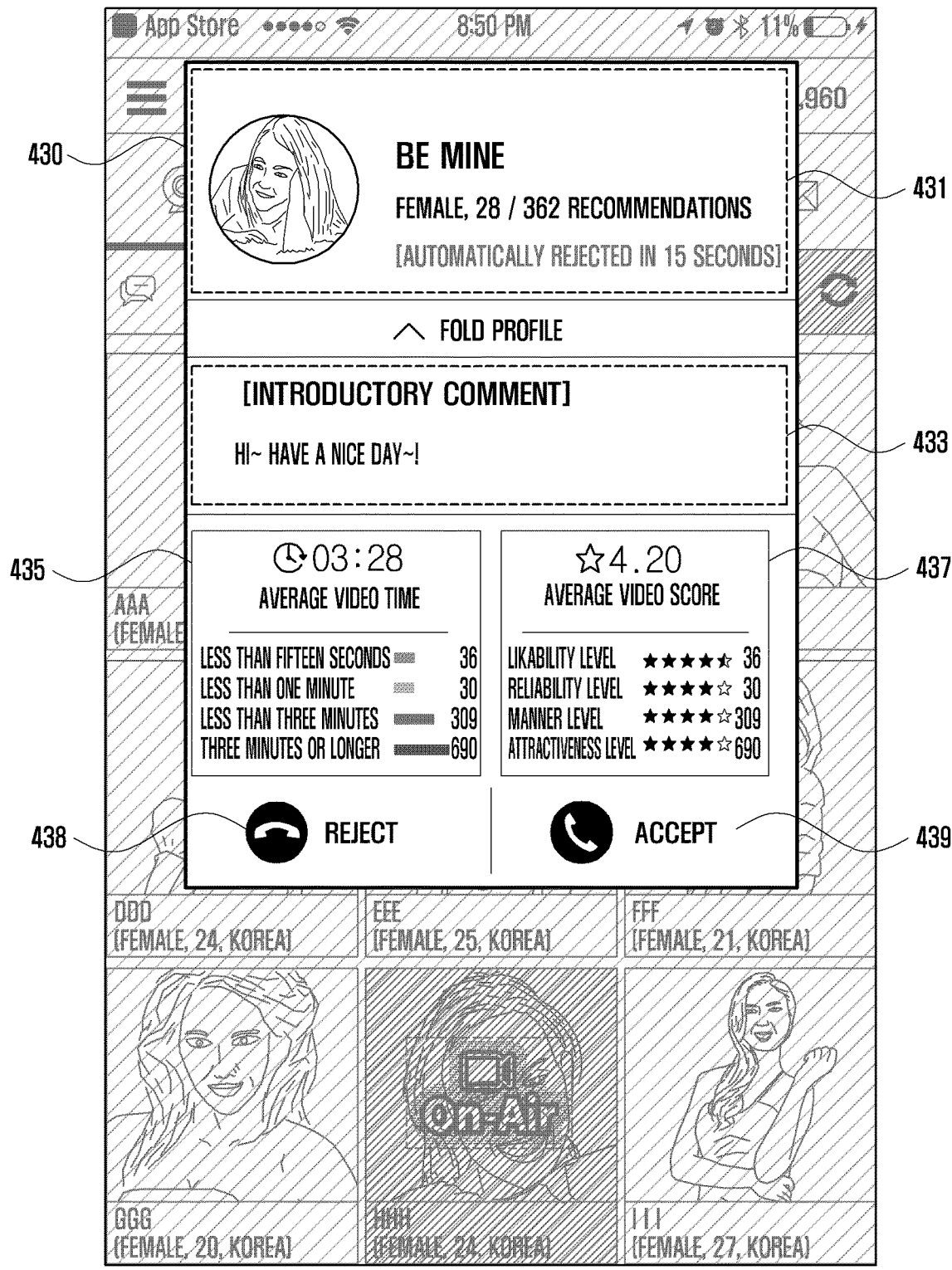
FIG. 4D is a diagram illustrating an example of receiving a video call request from a counterpart user according to various embodiments.

FIG. 4D is a diagram illustrating an example of receiving a video call request from a counterpart user according to various embodiments. If the counterpart user made a request for a video call, for example, the electronic device 110 may output a pop-up screen 430 related to the video call request of the counterpart user. The pop-up screen 430 related to the video call request of the counterpart user may include, for example, information (for example, gender and age) 431 regarding the counterpart user requested a video call. The pop-up screen 430 related to the video call request of the counterpart user may display, for example, an introductory comment 433 configured by the counterpart user. The pop-up screen 430 related to the video call request of the counterpart user may display, for example, a statistic material 435 regarding the video time for which the counterpart user made video calls in the past. The pop-up screen 430 related to the video call request of the counterpart user may display, for example, a statistical material 437 regarding video scores that reflect evaluation by other users who made video calls to the counterpart user in the past. The pop-up screen 430 related to the video call request of the counterpart user may provide, for example, a UI 438 for rejecting the video call request of the counterpart user and a UI 439 for accepting the video call request of the counterpart user. The statistical material 435 regarding the video time and the statistical material 437 regarding video scores may be received from the server 120.

Figure 5A:
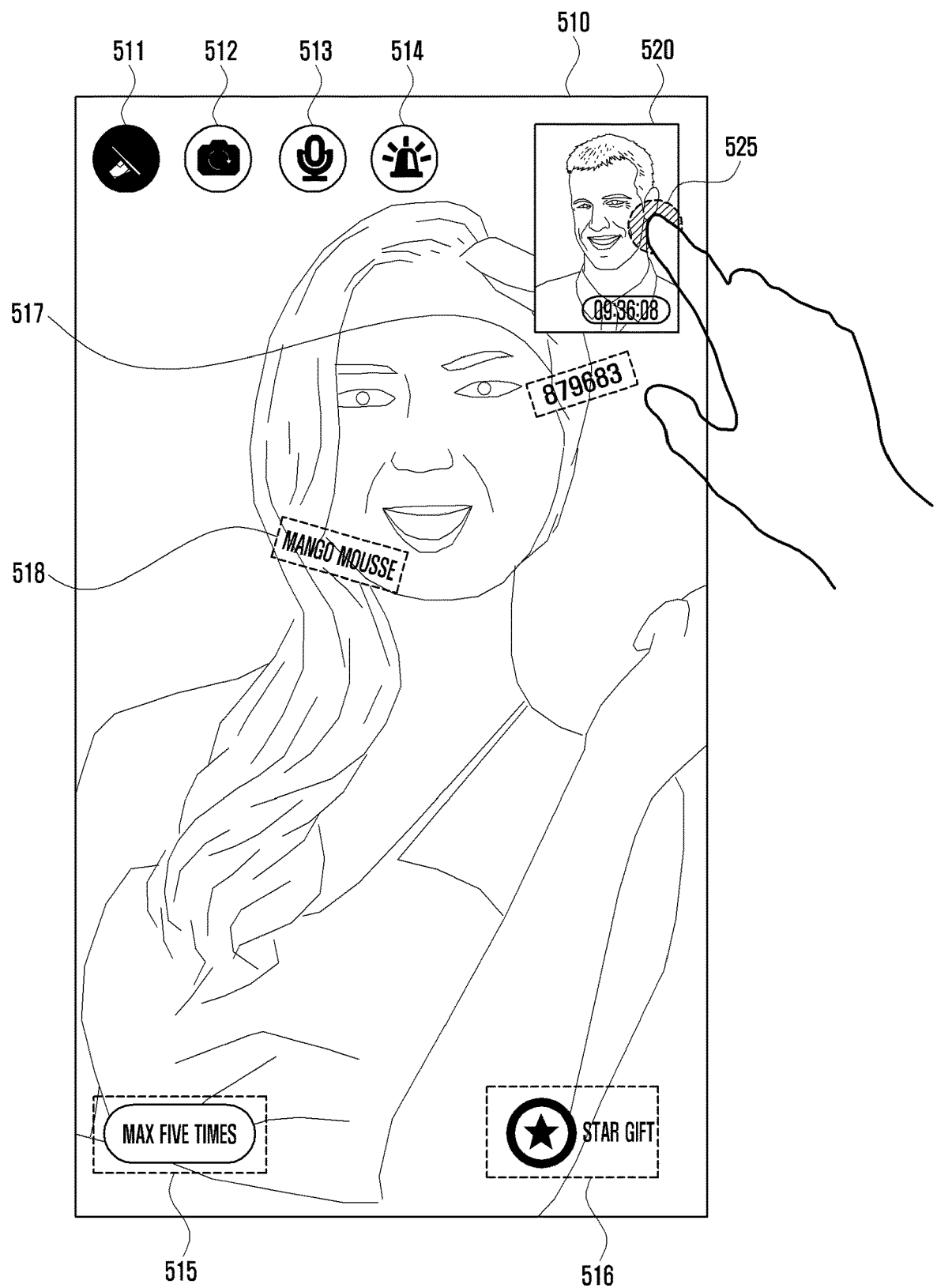
FIG. 5A is a diagram illustrating an example of making a video call according to various embodiments.
Figure 5B:
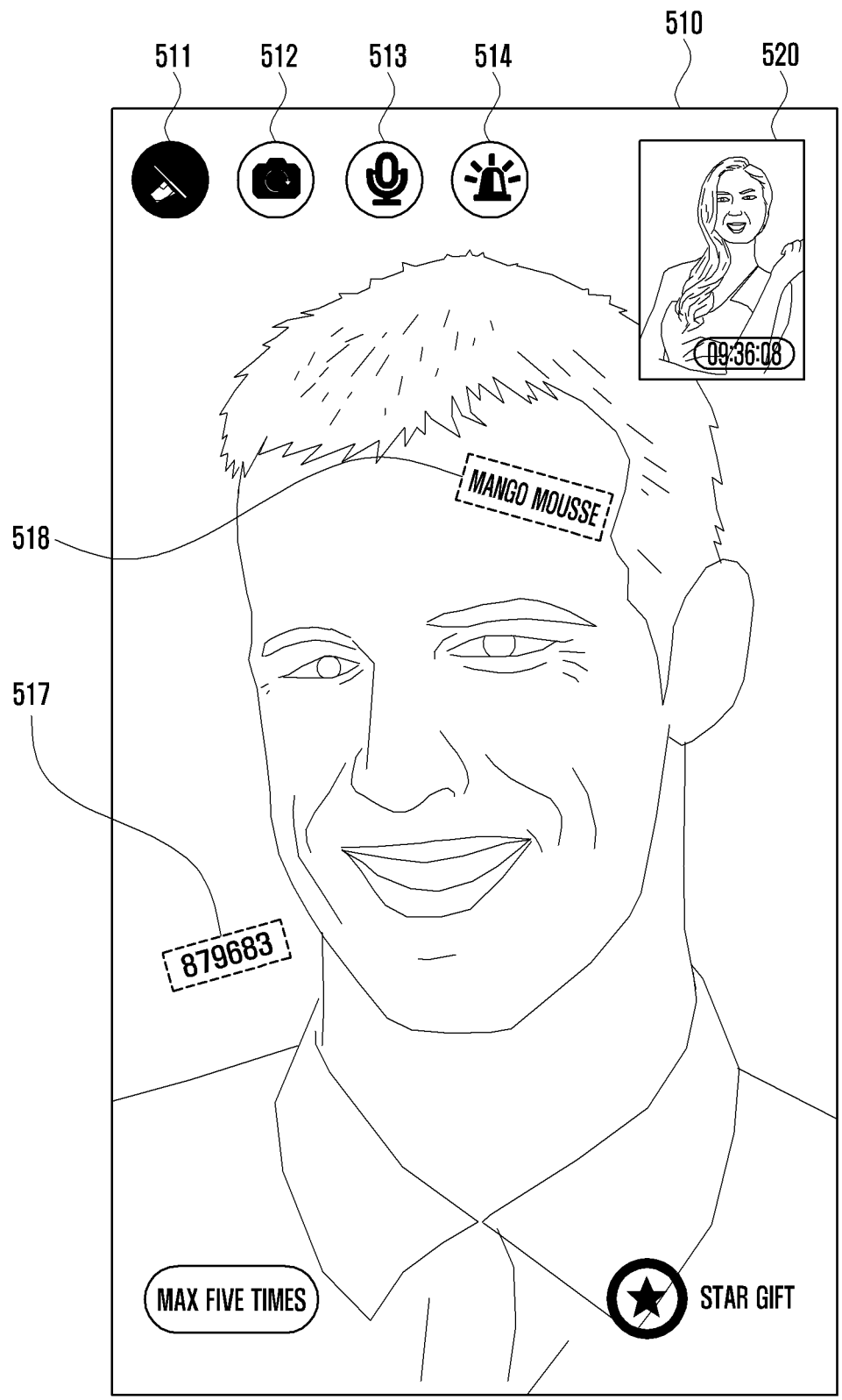
FIG. 5B is a diagram illustrating an example of making a video call according to various embodiments.
Figure 5C:
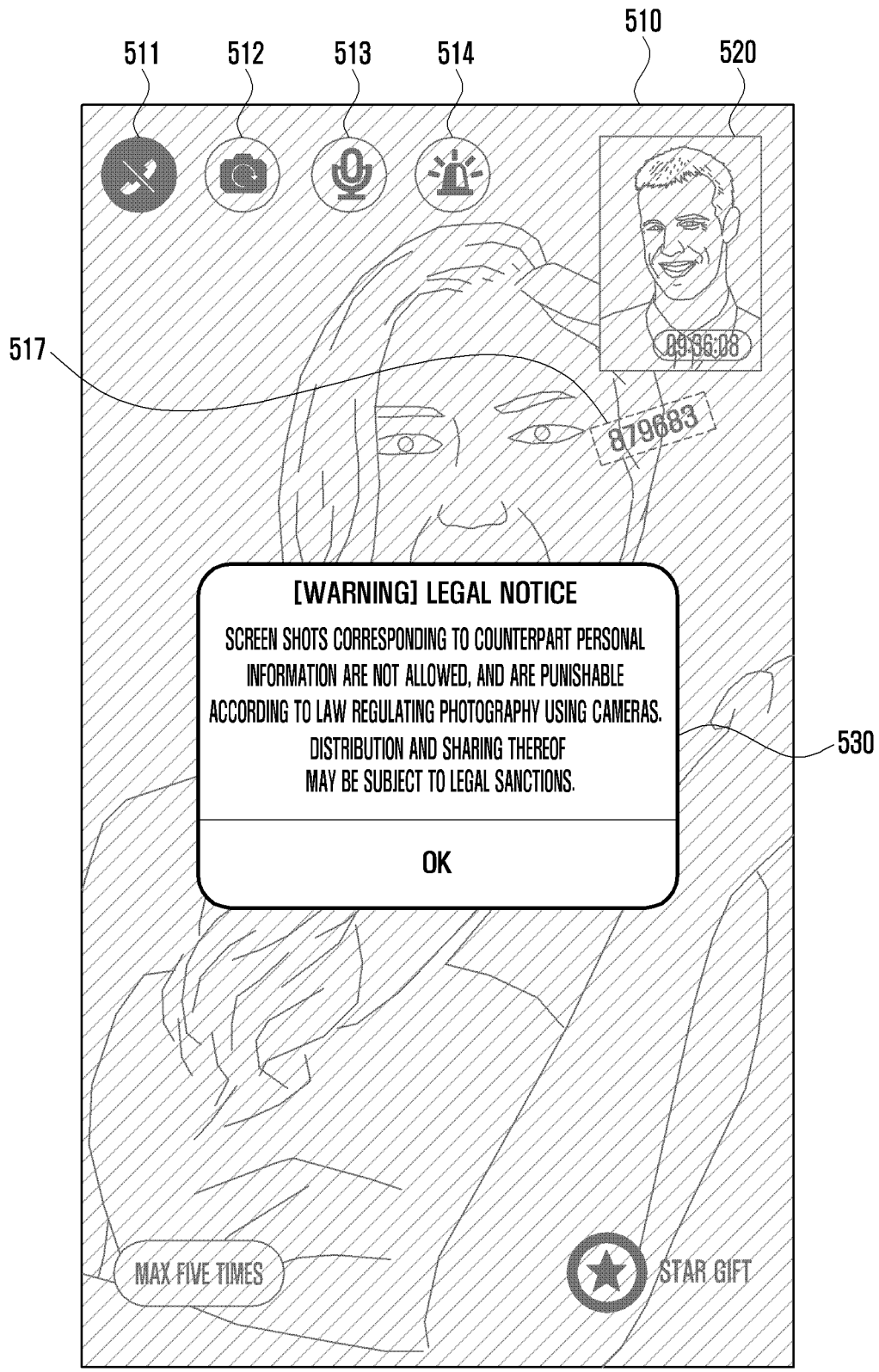
FIG. 5C is a diagram illustrating an example of making a video call according to various embodiments.
Figure 5D:
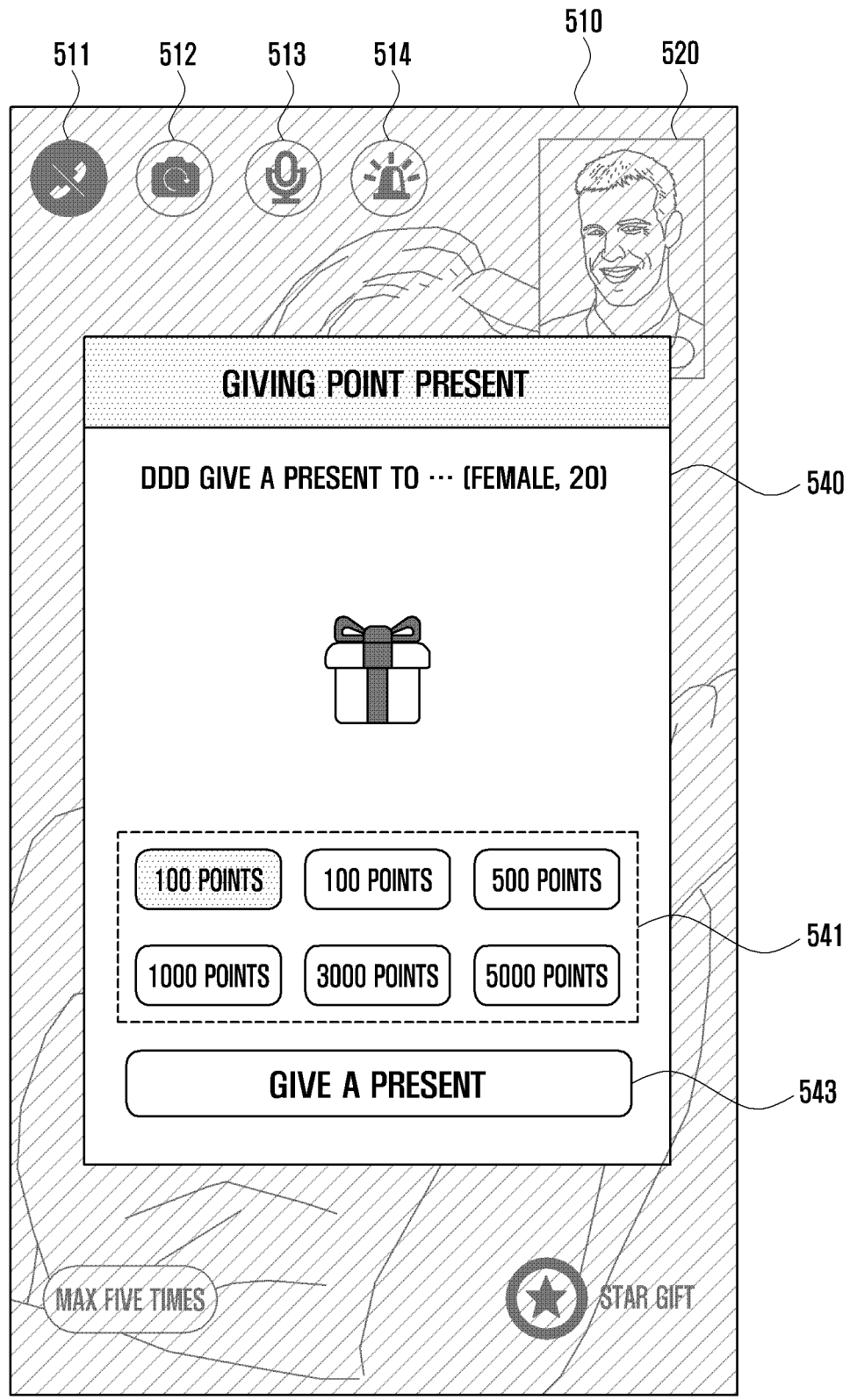
FIG. 5D is a diagram illustrating an example of making a video call according to various embodiments.
Figure 5E:
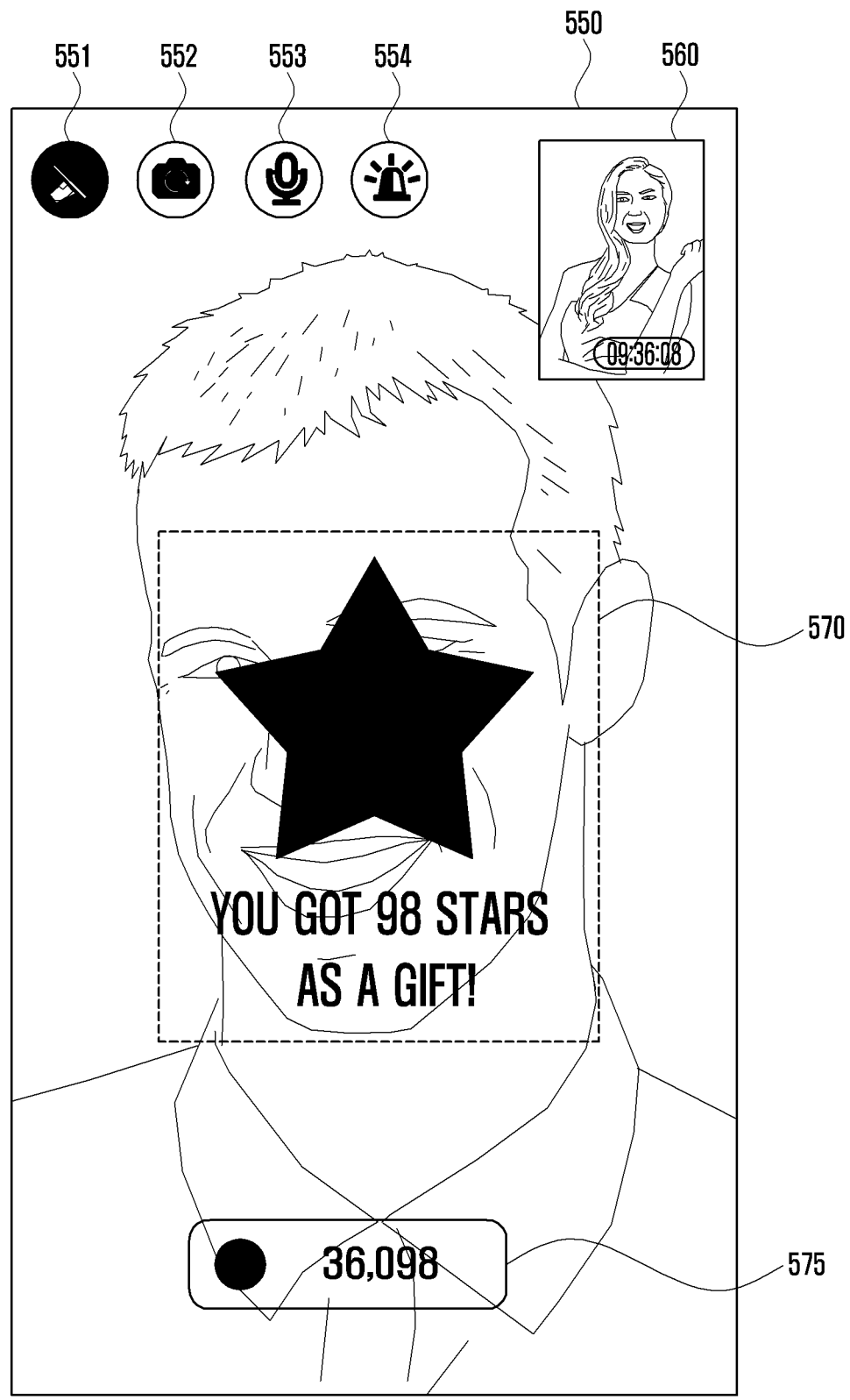
FIG. 5E is a diagram illustrating an example of making a video call according to various embodiments.

FIG. 5A is a diagram illustrating an example of making a video call according to various embodiments, FIG. 5B is a diagram illustrating an example of making a video call according to various embodiments, FIG. 5C is a diagram illustrating an example of making a video call according to various embodiments, FIG. 5D is a diagram illustrating an example of making a video call according to various embodiments, and FIG. 5E is a diagram illustrating an example of making a video call according to various embodiments. Referring to FIG. 5A, the electronic device 110 may output an image related to the user through the display 116 when performing a video call, for example. The electronic device 110 may output an image related to the counterpart user, for example, through the display 116. The electronic device 110 may display the image related to the user and the image related to the counterpart user on a single screen, for example. The electronic device 110 may conduct a control, for example, such that the image related to the user is displayed on the full screen 510, and the image related to the counterpart image is displayed in one area 520 of the full screen.

The electronic device 110 may provide a UI 511 for ending the video call, for example.

The electronic device 110 may provide a UI 512 for changing the image related to the user, for example. If the user selects the UI 512 for changing the image related to the user, for example, the electronic device 110 may determine an image to be displayed on the electronic device of the counterpart user instead of the image related to the user.

The electronic device 110 may provide a UI 513 for stopping the function of acquiring a sound related to the user through the sound input device included in the audio module 114, for example.

The electronic device 110 may provide a UI 514 for reporting the counterpart user of the video call, for example. If the user selects the UI 514 for reporting the counterpart user, for example, the electronic device 110 may transmit information regarding the counterpart user to the server 120.

The electronic device 110 may display information 515 regarding the maximum number of times points related to use of the video call service, which are held by the user, can be transferred to the counterpart user. The electronic device 110 may provide a UI 516 for transferring the points related to use of the video call service, which are held by the user, to the counterpart user, for example.

The electronic device 110 may display watermarks 517 and 518, for example. The watermarks may be visible watermarks, for example. The electronic device 110 may display the images output through the display 116 and the visible watermarks in an overlay type. If the visible watermarks are inserted, the visible watermarks may be inserted into an area in which an image related to the counterpart user is displayed, for example. The visible watermarks may include, for example, information regarding the user (for example, the user's name, ID, or nickname). The visible watermarks may be output so as to continuously move in the area in which the image is displayed. The electronic device 110 may receive a user input 525 of selecting one area 520 of the full screen, in which the image related to the counterpart user is displayed, for example.

Referring to FIG. 5B, if the electronic device 110 receives a user input 525 of selecting one area 520 of the full screen, in which the image related to the counterpart user is displayed, the electronic device 110 may replace the image output on the full screen 510 and the image displayed on one area 520 of the full screen. For example, the electronic device 110 may conduct a control such that the image related to the counterpart user is displayed on the full screen 510, and the image related to the user is displayed on one area 520 of the full screen.

Referring to FIG. 5C, if the electronic device 110 receives a user input related to a function of acquiring an image of the screen output through the display 116 (capture function), the electronic device 110 may output a warning message 530 indicating that it is impossible to perform the capture function. The electronic device 110 may output the warning message 530 indicating that it is impossible to perform the capture function on a pop-up screen, for example.

Referring to FIG. 5D, if the electronic device 110 receives a user input of selecting the UI 516 for transferring points related to use of the video call service, which are held by the user, to the counterpart user, the electronic device 110 may provide a UI 540 related to a point transfer function. The electronic device 110 may output the UI 540 related to the point transfer function on a pop-up screen, for example. The UI 540 related to the point transfer function may include a UI 541 for selecting the number of points to be transferred to the counterpart user and a UI 543 for determining execution of the point transfer function.

If the electronic device 110 receives a user input related to transferring points to the counterpart user, the electronic device 110 may transmit a request for transferring the points to the counterpart to the server 120. The server 120 may transmit information regarding transferred points to the external electronic device 130 in response to the transmitted request. In this case, the server 120 may subtract specific points from the points held by the user of the electronic device 110, and may increase points held by the counterpart user by the subtracted points. The amount of points held by each user may be stored in the server 120 and managed thereby, and may be updated in real time.

Referring to FIG. 5E, if the user transfers points to the counterpart user by using the UI 540 related to the point transfer function, the electronic device (external electronic device 130) of the counterpart user may display information 570 regarding the points transferred from the user on the full screen 550. If the user transfers points to the counterpart user by using the UI 540 related to the point transfer function, the external electronic device 130 may display information 575 regarding points currently held by the user of the external electronic device 130 on the full screen 550.

The external electronic device 130 may conduct a control, for example, such that the image related to the user of the external electronic device 130 is displayed on the full screen 550, and the image related to the counterpart user of the video call is displayed on one area 560 of the full screen.

The external electronic device 130 may provide a UI 551 for ending the video call, for example.

The external electronic device 130 may provide a UI 552 for changing the image related to the user of the external electronic device 130, for example.

The external electronic device 130 may provide a UI 553 for stopping the function of acquiring a sound related to the user of the external electronic device 130 through the sound input device, for example.

The external electronic device 130 may provide a UI 554 for reporting the counterpart user of the video call, for example. For example, if the user of the external electronic device 130 selects the UI 554 for reporting the counterpart user of the video call, the external electronic device 130 may transmit information regarding the counterpart user of the video call to the server 120.

Figure 5F:
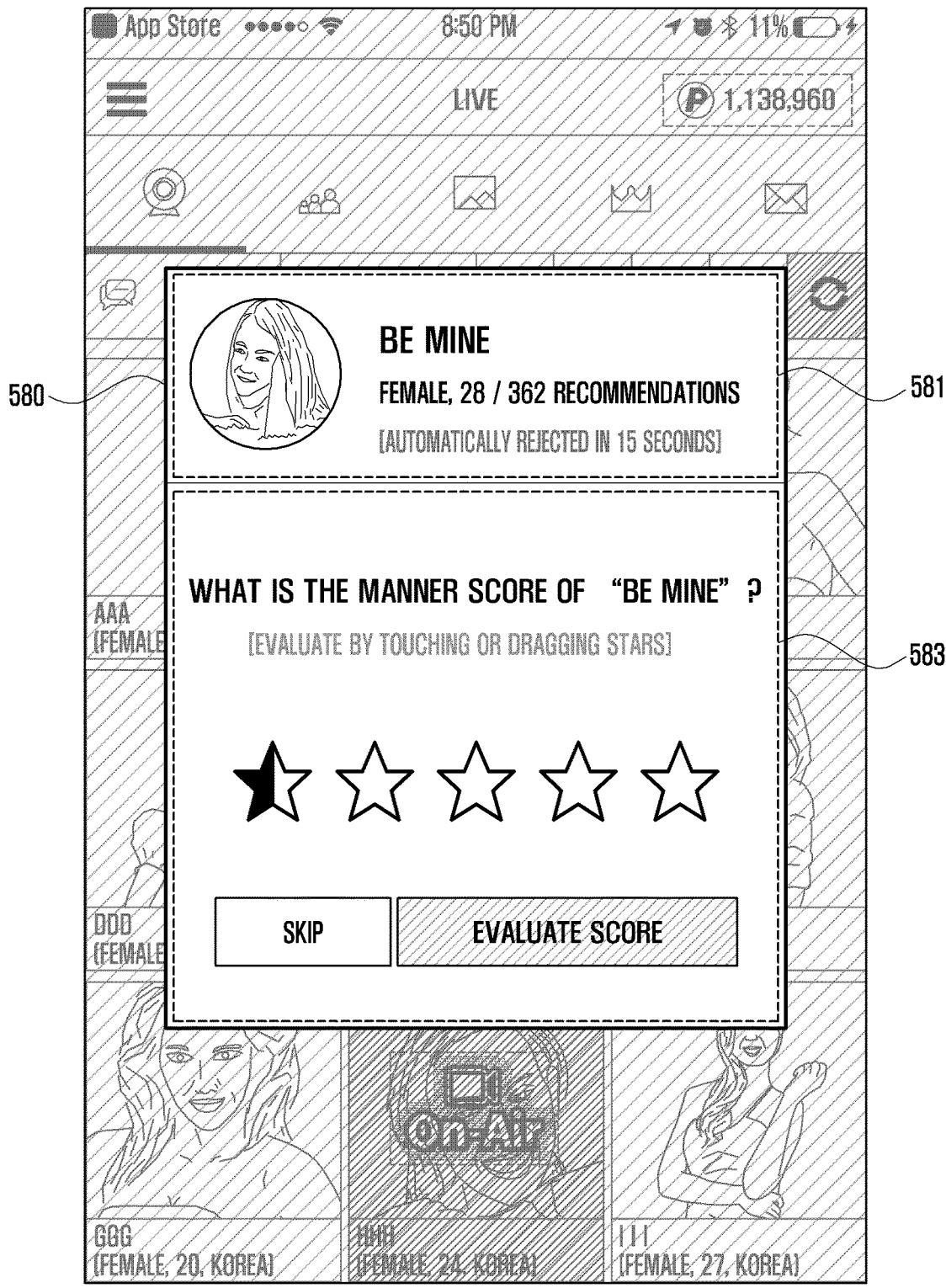
FIG. 5F is a diagram illustrating an exemplary method for evaluating a counterpart user after a video call is over according to various embodiments.

FIG. 5F is a diagram illustrating an exemplary method for evaluating a counterpart user after a video call is over according to various embodiments. If a video call to the counterpart user is ended, the electronic device 110 may output a pop-up screen 580 for evaluating the video score of the counterpart user. The pop-up screen 580 for evaluating the video score of the counterpart user may include, for example, a UI 583 that enables evaluation of the video score of the counterpart user with regard to each preconfigured item. The video score of the counterpart user evaluated by the user may be transmitted to the server 120. The server 120 may accumulate and store the transmitted information regarding the video score with regard to the profile of the counterpart user. The server 120 may calculate the average video score of the counterpart user by using the accumulated and stored value. The server 120 may transmit information regarding the calculated average video score of the counterpart user to the electronic device 110 and to the external electronic device 130.

Figure 6A:
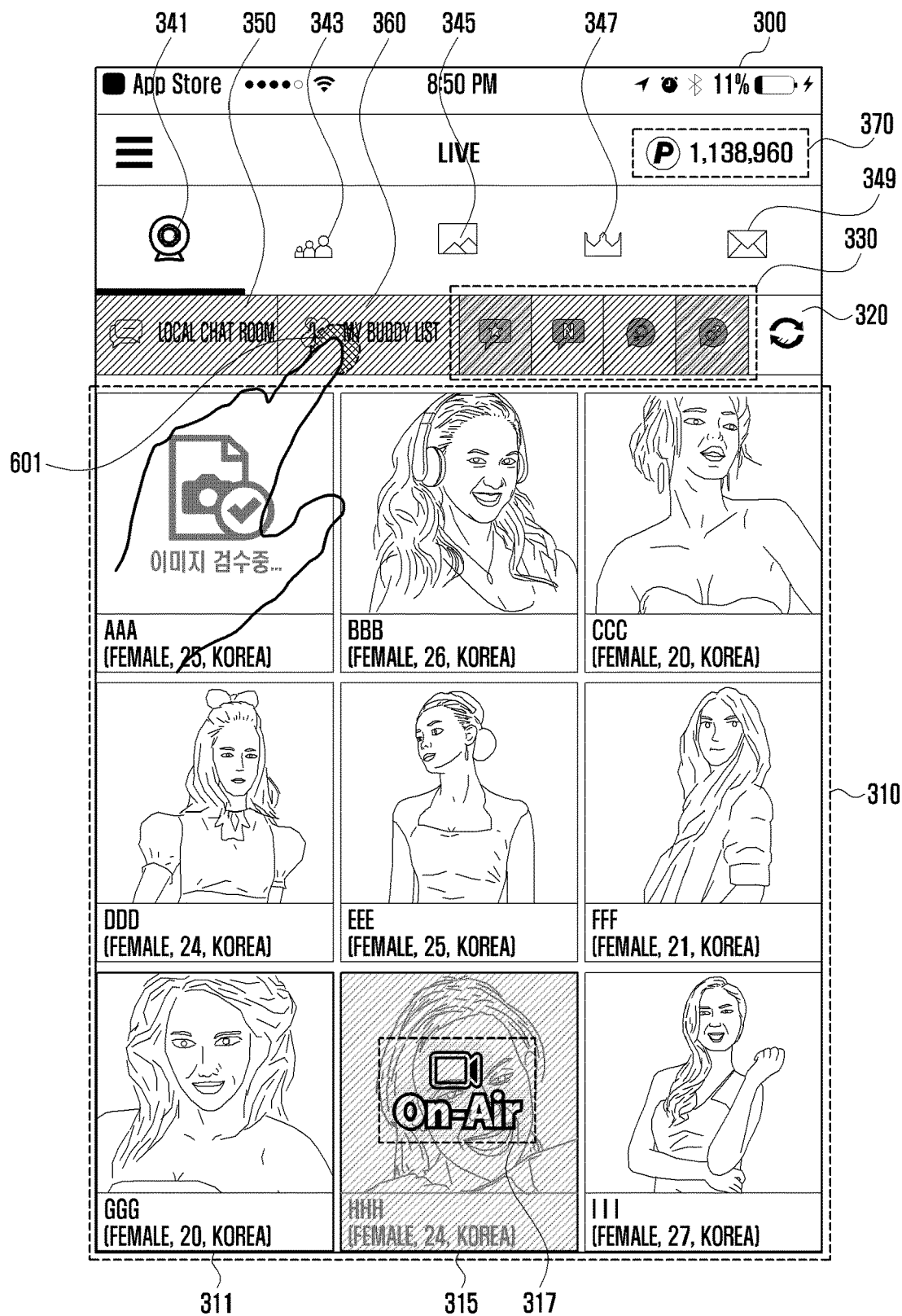
FIG. 6A is a diagram illustrating an exemplary function of managing a buddy list of a video call service according to various embodiments.
Figure 6B:
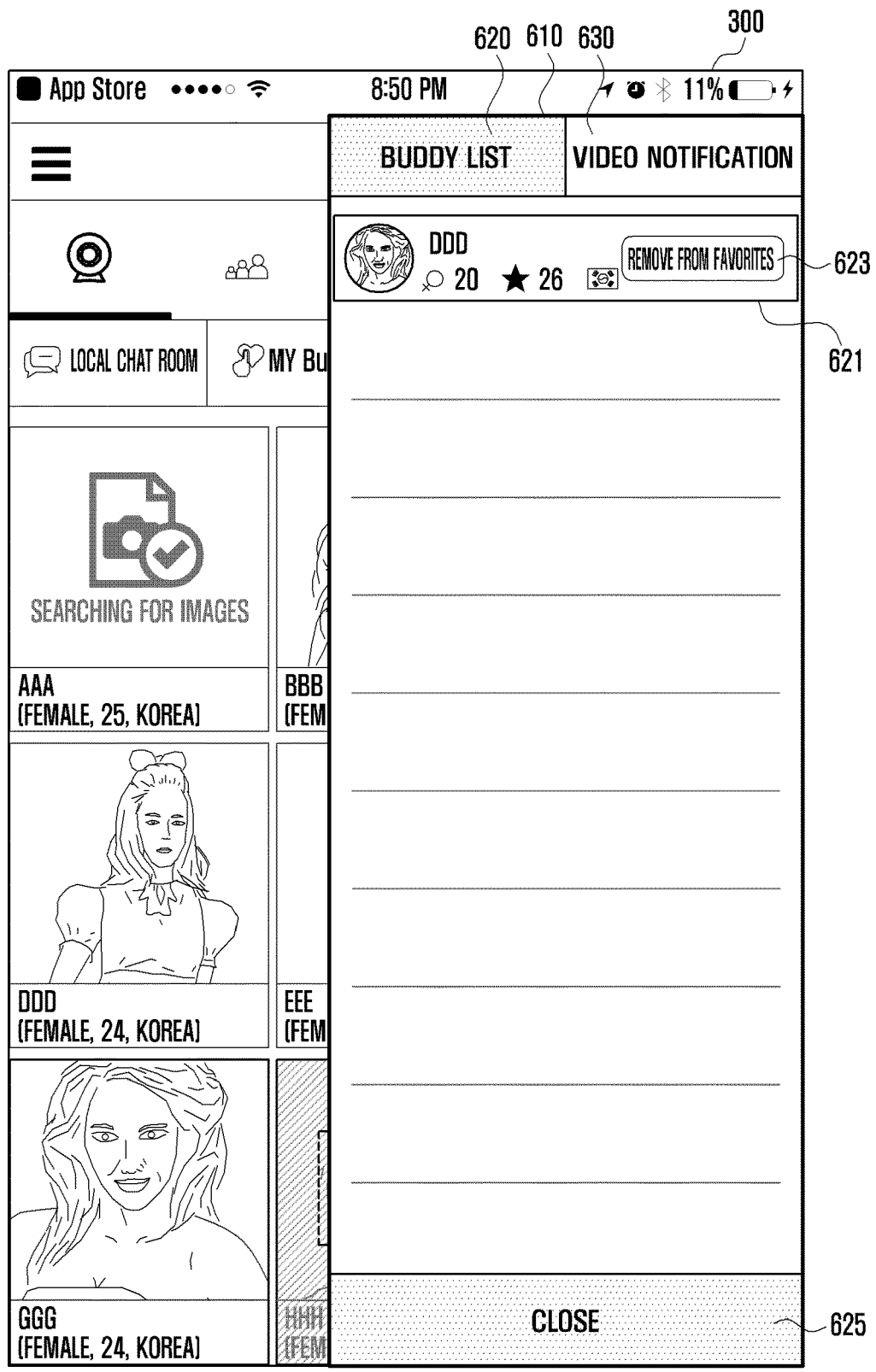
FIG. 6B is a diagram illustrating an exemplary function of managing a buddy list of a video call service according to various embodiments.
Figure 6C:
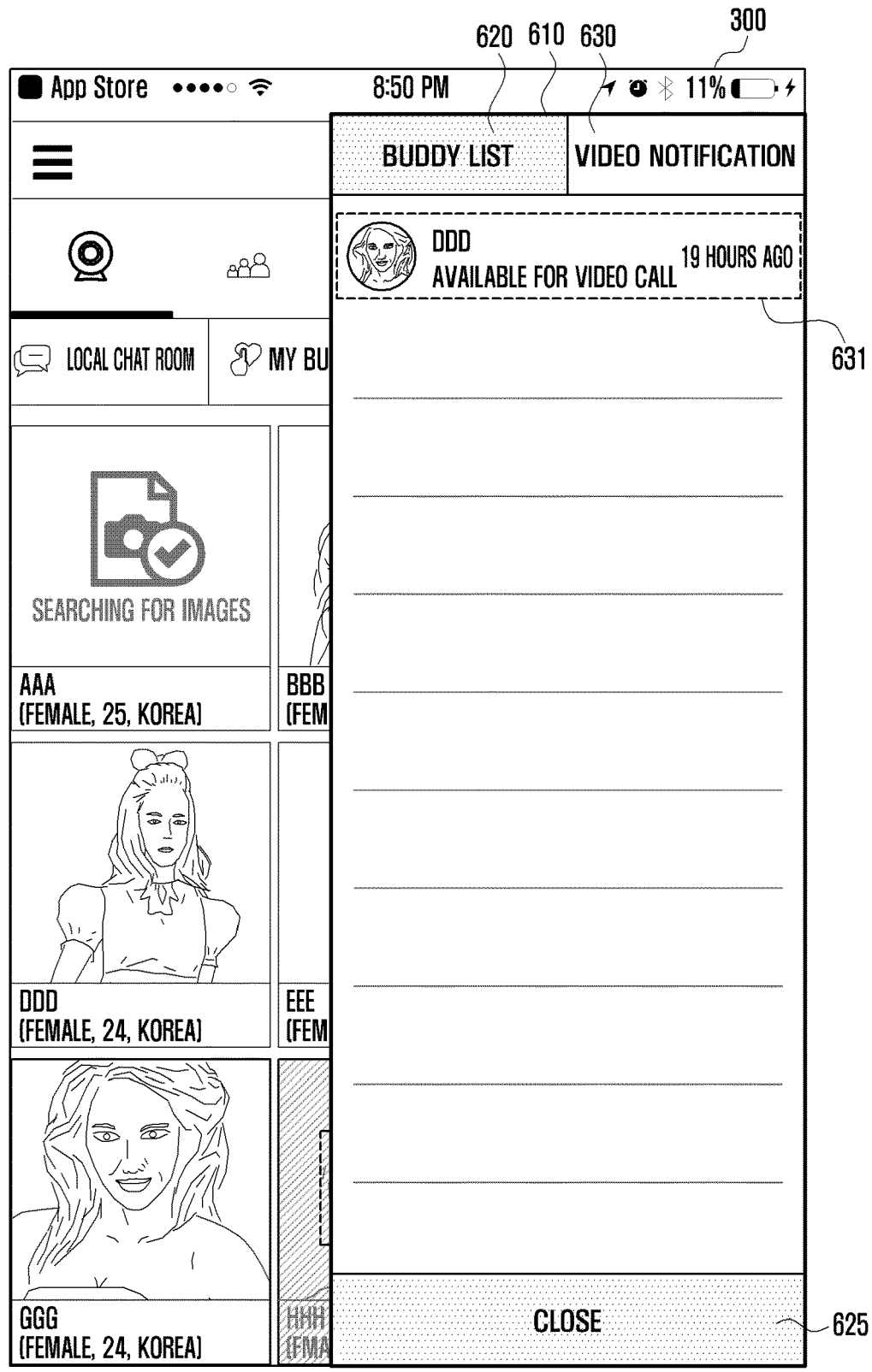
FIG. 6C is a diagram illustrating an exemplary function of managing a buddy list of a video call service according to various embodiments.

FIG. 6A is a diagram illustrating an exemplary function of managing a buddy list of a video call service according to various embodiments, FIG. 6B is a diagram illustrating an exemplary function of managing a buddy list of a video call service according to various embodiments, and FIG. 6C is a diagram illustrating an exemplary function of managing a buddy list of a video call service according to various embodiments.

Referring to FIG. 6A, the electronic device 110 may receive a user input 601 of selecting a UI 360 related to the user's buddy list displayed on an application screen 300 related to the video call service.

Referring to FIG. 6B, if the electronic device 110 receives a user input 601 of selecting the UI 360 related to the user's buddy list, the electronic device 110 may output a pop-up screen 610 that displays the user's buddy list.

The electronic device 110 may provide a UI 620 for displaying information regarding at least one counterpart user included in the user's buddy list, through the pop-up screen 610 that displays the user's buddy list, for example. If the electronic device 110 receives a user input of selecting the UI 620 that displays information regarding at least one counterpart user included in the user's buddy list, for example, the electronic device 110 may display information 621 regarding at least one counterpart user included in the user's buddy list. The electronic device 110 may provide a UI 623 for removing at least one counterpart user included in the user's buddy list from the user's buddy list, for example.

The electronic device 110 may provide a UI 625 for ending output of the pop-up screen 610 that displays the user's buddy list.

Referring to FIG. 6C, the electronic device 110 may provide a UI 630 that displays information indicating that at least one counterpart user included in the user's buddy list is currently available for a video call, through the pop-up screen 610 that displays the user's buddy list, for example. If the electronic device 110 receives a user input selecting the UI 630 that displays information indicating that at least one counterpart user included in the user's buddy list is currently available for a video call, for example, the electronic device 110 may display information 631 indicating that at least one counterpart user included in the user's buddy list is currently available for a video call.

If the electronic device 110 receives, through the server 120, information indicating that at least one counterpart user included in the user's buddy list has logged into the video call service, for example, the electronic device 110 may provide a notification in response to reception of the information. For example, the method for providing the notification may include at least one method selected from a message display method, a sound output method, and a vibration output method.

Figure 7:
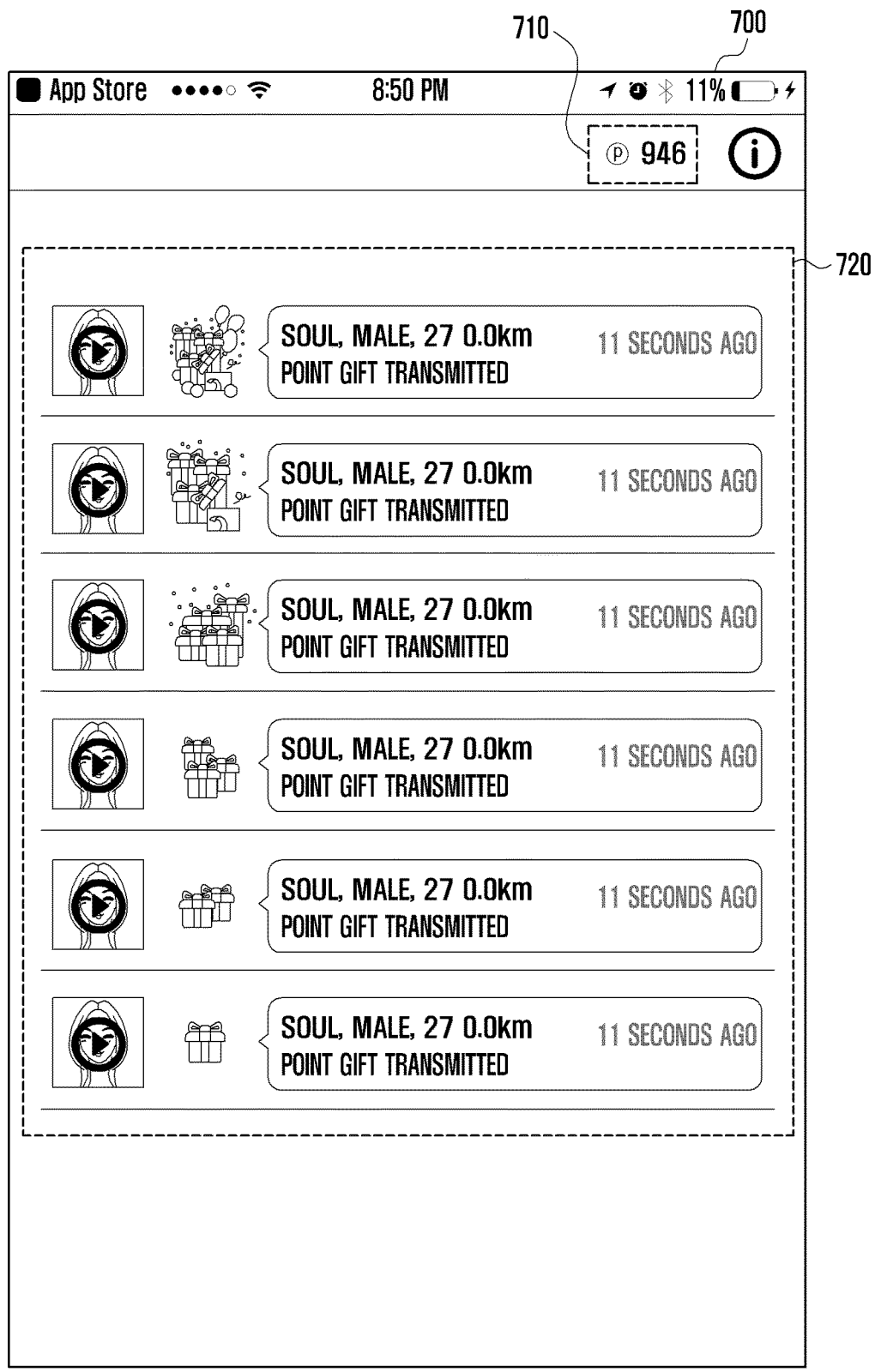
FIG. 7 is a diagram illustrating an example of displaying a history regarding points related to use of a video call service according to various embodiments.

FIG. 7 is a diagram illustrating an example of displaying a history regarding points related to use of a video call service according to various embodiments.

Referring to FIG. 7, the electronic device 110 may output a history screen 700 that displays a history related to points, for example. The history screen 700 may display points 710 related to use of the video call service, which are held by the user of the electronic device 110, for example.

The history screen 700 may display, for example, a point transfer detail 720. The point transfer detail 720 may include, for example, a detail regarding transfer of points from the user to at least one counterpart user and/or a detail regarding transfer of points from at least one counterpart user to the user.

Figure 8A:
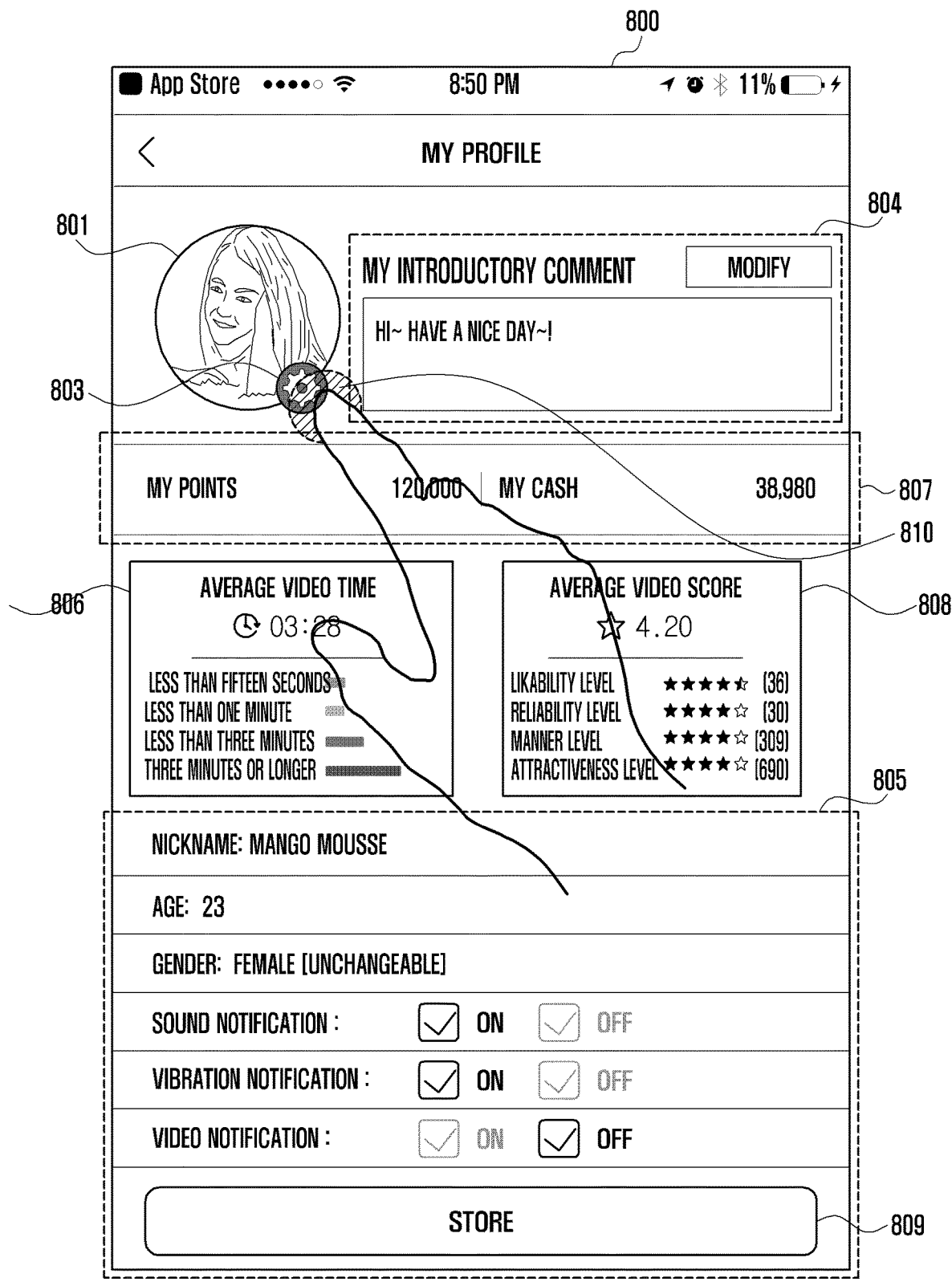
FIG. 8A is a diagram illustrating an example of configuring user information related to a video call service according to various embodiments.
Figure 8B:
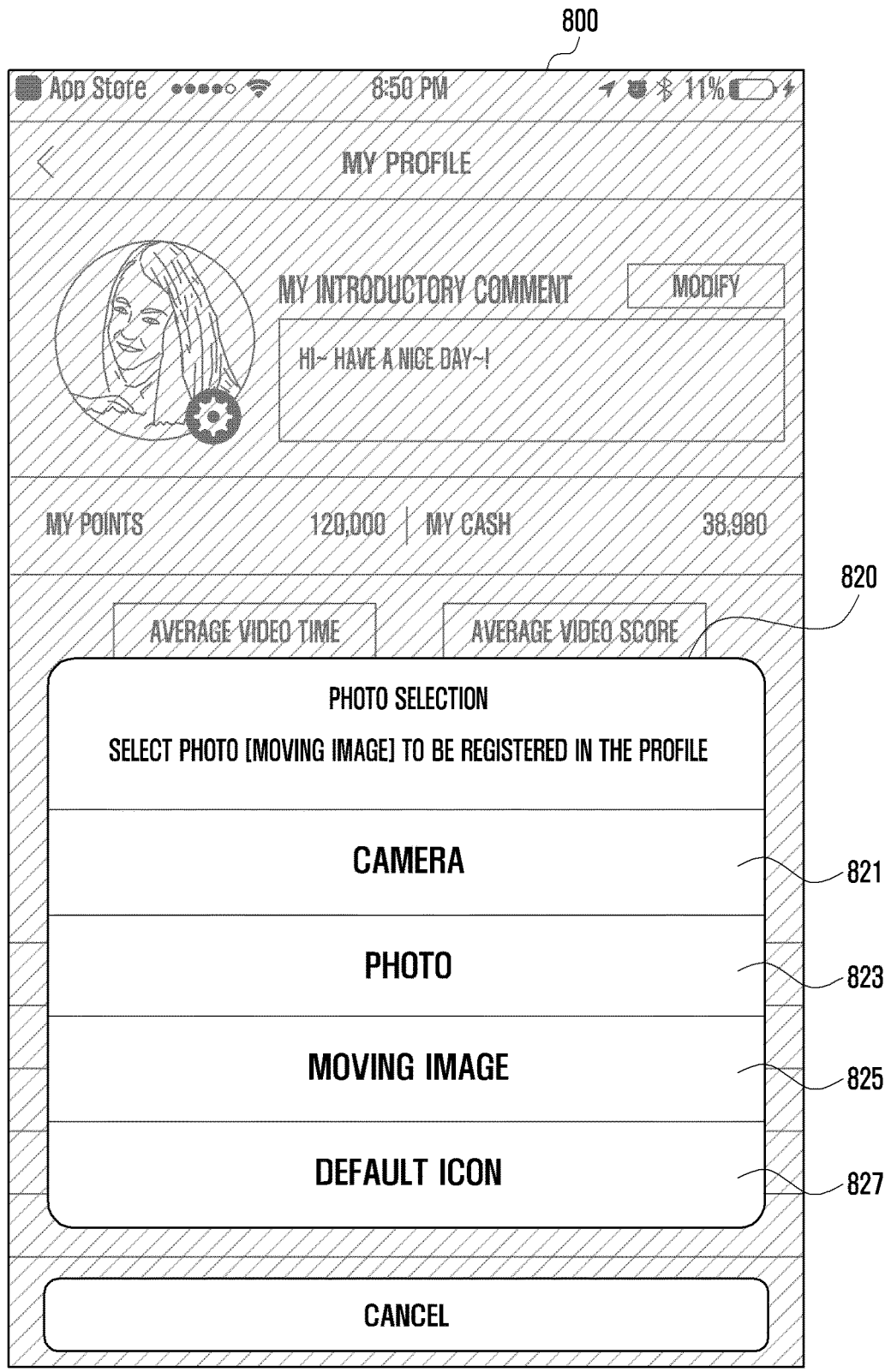
FIG. 8B is a diagram illustrating an example of configuring user information related to a video call service according to various embodiments.

FIG. 8A is a diagram illustrating an example of configuring user information related to a video call service according to various embodiments, and FIG. 8B is a diagram illustrating an example of configuring user information related to a video call service according to various embodiments.

Referring to FIG. 8A, the electronic device 110 may output a configuration screen 800 that enables configuration of user information related to the video call service, for example.

The configuration screen 800 may display an image 801 corresponding to the user, for example. The configuration screen 800 may display a UI 803 for changing the image corresponding to the user. The configuration screen 800 may display, for example, a UI 804 for changing the user's introductory comment. The configuration screen 800 may display, for example, a UI 805 for changing the user's information. The configuration screen 800 may display, for example, points and cash 807 related to use of the video call service, which are held by the user. The configuration screen 800 may display, for example, a statistic material 806 regarding the video time for which the user made video calls in the past. The configuration screen 800 may display, for example, a statistical material 808 regarding video scores that reflect evaluation by counterpart users who made video calls to the user in the past. The configuration screen 800 may display, for example, a UI 809 for storing the user's information. If the user selects the UI 809 for storing the user's information, for example, the electronic device 110 may store the changed user's information. If the user selects the UI 809 for storing the user's information, for example, the changed user's information may be transmitted to the user 120.

The electronic device 110 may receive a user input 810 of selecting the UI 803 for changing the image corresponding to the user, for example.

Referring to FIG. 8B, if the electronic device 110 receives a user input 810 of selecting the UI 803 for changing the image corresponding to the user, the electronic device 110 may output a pop-up screen 820 that determines the type of the image corresponding to the user.

If the electronic device 110 receives a user input of selecting the camera UI 821 displayed on the pop-up screen 820 that determines the type of the image corresponding to the user, for example, the electronic device 110 may execute a function of taking an image through the camera module 113, and may determine a still or moving image acquired through the camera module 113 as the image corresponding to the user.

If the electronic device 110 receives a user input of selecting the photo UI 823 displayed on the pop-up screen 820 that determines the type of the image corresponding to the user, for example, the electronic device 110 may execute a multimedia application that enables management of at least one still image and/or moving image stored in the electronic device 110, and may determine a still image selected by the user through the multimedia application as the image corresponding to the user.

If the electronic device 110 receives a user input of selecting the moving image UI 825 displayed on the pop-up screen 820 that determines the type of the image corresponding to the user, for example, the electronic device 110 may execute a multimedia application that enables management of at least one still image and/or moving image stored in the electronic device 110, and may determine a moving image selected by the user through the multimedia application as the image corresponding to the user.

If the electronic device 110 receives a user input of selecting the default icon UI 827 displayed on the pop-up screen 820 that determines the type of the image corresponding to the user, for example, the electronic device 110 may determine a preconfigured default icon as the image corresponding to the user.

Although not illustrated specifically in the drawings, the electronic device 110 may output a detailed log management screen for displaying a UI that enables management of a detailed log related to the video call service, for example. The detailed log management screen may display, for example, a detailed log regarding the time of use of the video call service by the user and regarding the counterpart user. If a video call request has been received from the counterpart user, and if there is no user input in response to the request, for example, the detailed log management screen may display a detailed log regarding the counterpart user who requested the video call and the time at which the video call request was made.

Figure 9A:
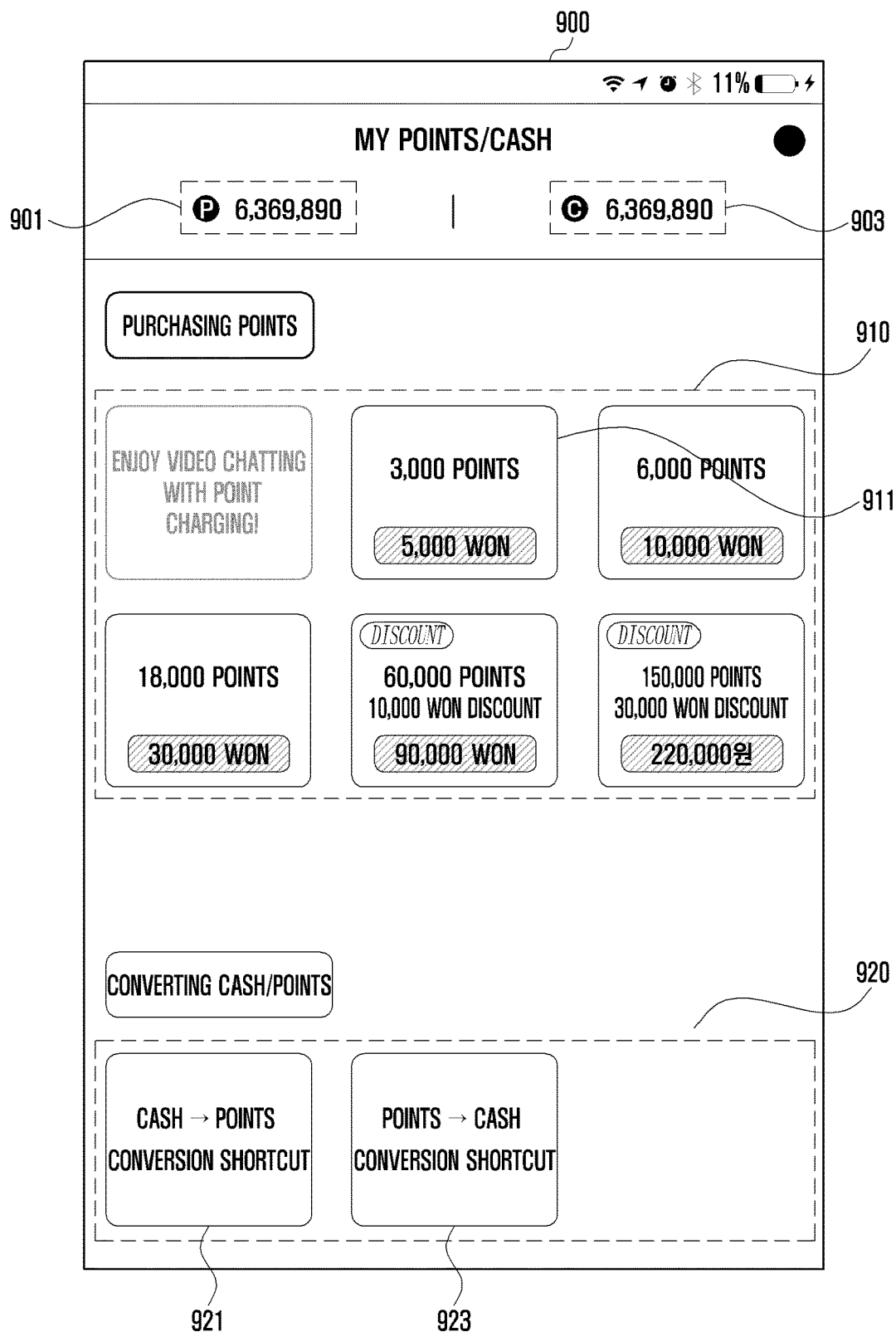
FIG. 9A is a diagram illustrating an example of providing an additional function to a user who satisfies a predetermined condition according to various embodiments.
Figure 9B:
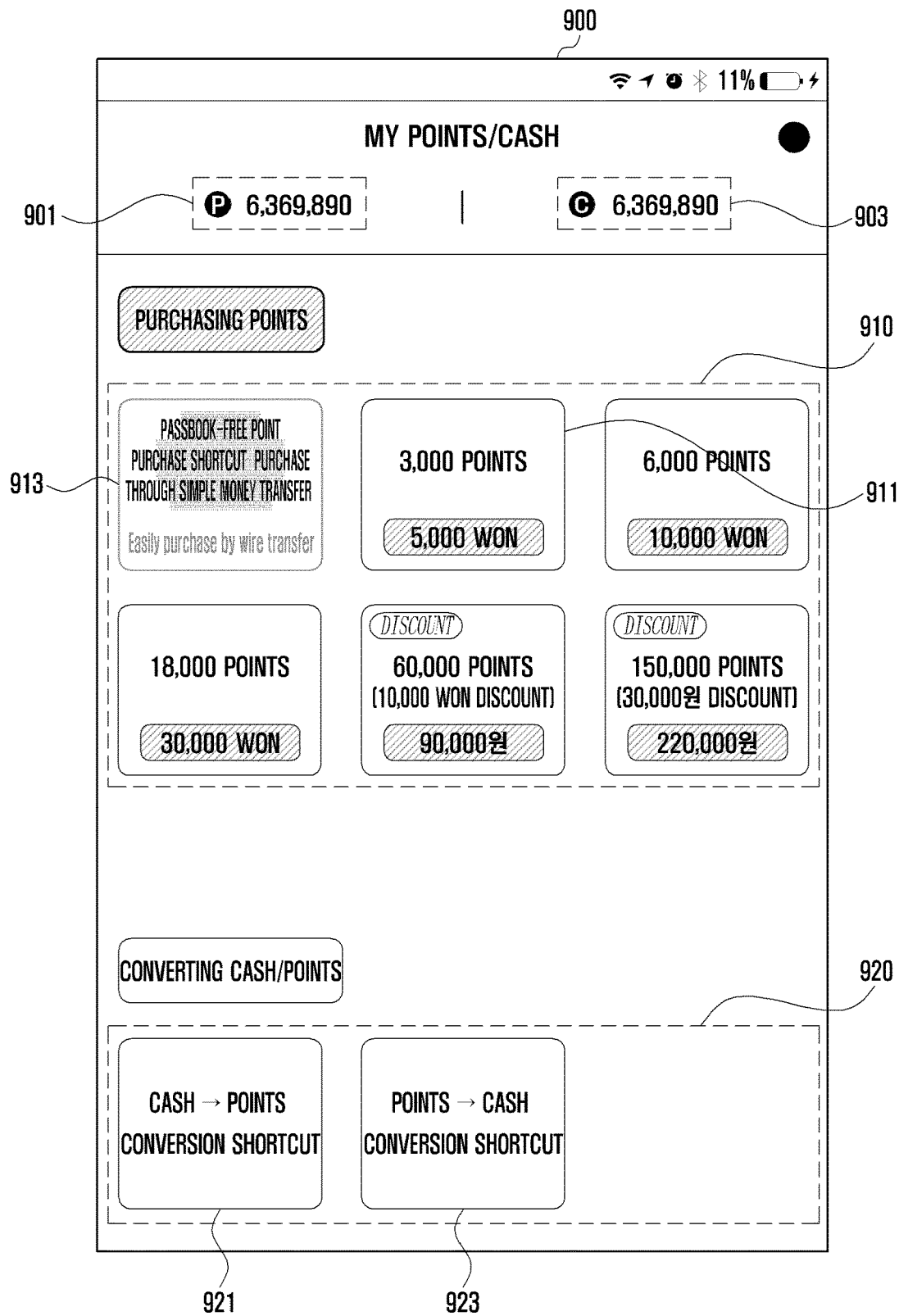
FIG. 9B is a diagram illustrating an example of providing an additional function to a user who satisfies a predetermined condition according to various embodiments.

FIG. 9A is a diagram illustrating an example of providing an additional function to a user who satisfies a predetermined condition according to various embodiments, and FIG. 9B is a diagram illustrating an example of providing an additional function to a user who satisfies a predetermined condition according to various embodiments.

Referring to FIG. 9A, the electronic device 110 may output a point management screen 900 for displaying a UI that enables management of points related to the video call service, for example. The point management screen 900 may display information 901 regarding points related to the video call service, which are held by the user, for example.

The point management screen 900 may display a UI that supports and enables the user to purchase points related to the video call service through one area 910, for example. If the user selects the UI 911 that supports and enables the user to purchase 3,000 points, for example, the electronic device 110 may perform an operation related to purchase of 3,000 points.

The electronic device 110 may transmit information regarding purchase of points related to the video call service to the server 120, for example. The electronic device 110 may perform a payment operation related to purchase of 3,000 points, for example, and may transmit information regarding point purchase and payment to the server 120.

The point management screen 900 may display information 903 regarding cash, which refer to points that can be used for another service related to the video call service, for example. The cash may refer to points that can be used to purchase products in connection with a shopping service related to the video call service, for example. The cash may refer to points that can be exchanged with a currency in connection with a financial service related to the video call service, for example.

The point management screen 900 may display, for example, a UI 921 for converting points related to the video call service into cash and/or a UI 923 for converting cash into points related to the video call service, through one area 920.

Referring to FIG. 9B, the electronic device 110 may receive information regarding an additional function provided to a user who purchased at least predetermined points related to the video call service from the server 120, for example. If the user purchased 150,000 points or more, for example, the server 120 may transmit information regarding an additional function to the electronic device 110 such that the additional function can be used.

The electronic device 110 may display an icon 913 related to the additional function on the basis of the information regarding the additional function, for example. The icon 913 related to the additional function may be a UI related to execution of the additional function, for example.

Figure 10:
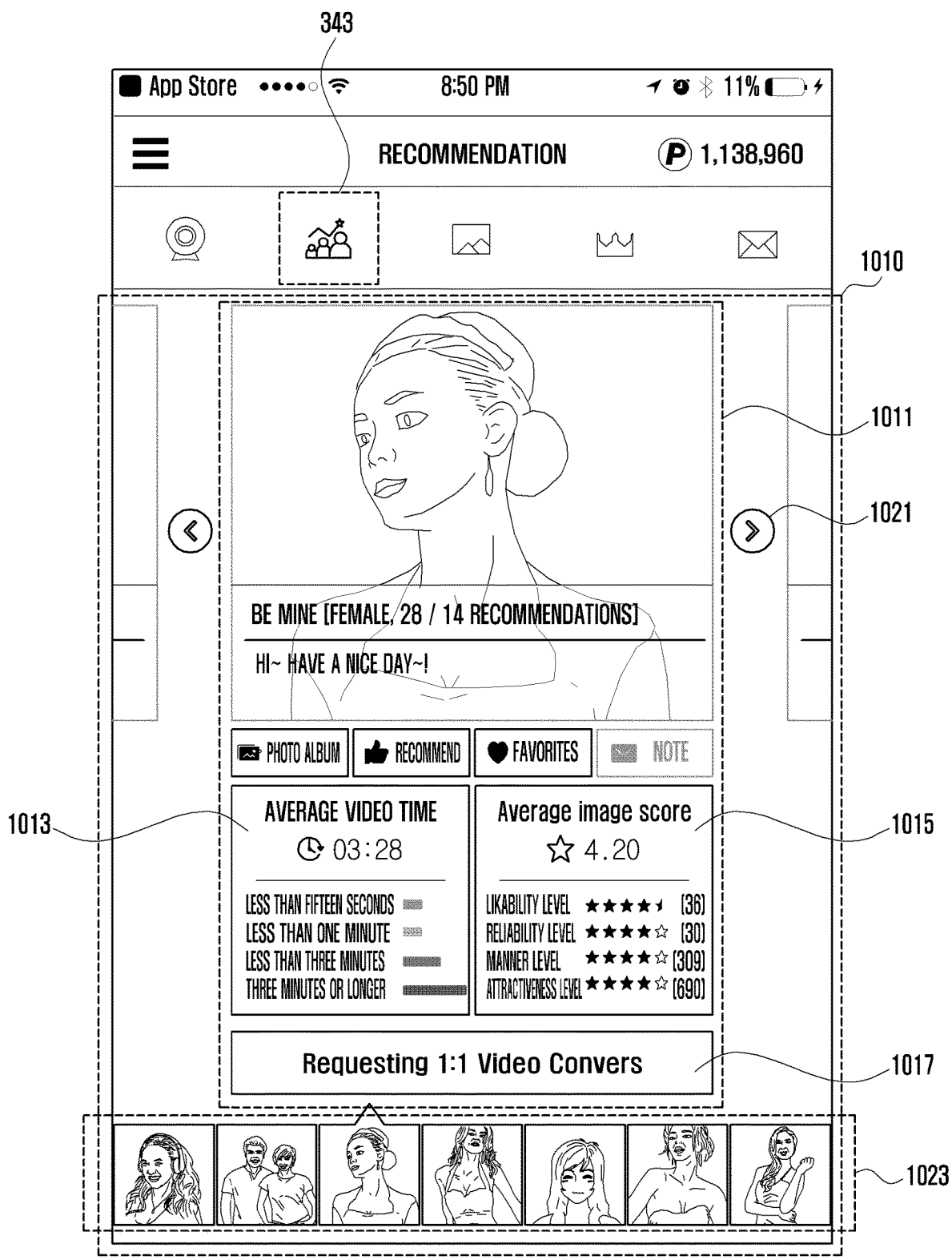
FIG. 10 is a diagram illustrating an exemplary screen for providing a function of recommending at least one counterpart user to a user according to various embodiments.

FIG. 10 is a diagram illustrating an exemplary screen for providing a function of recommending at least one counterpart user to a user according to various embodiments.

Referring to FIG. 10, the electronic device 110 may provide a UI 343 related to a recommended counterpart user list through an application screen related to the video call service, for example. The electronic device may receive a user input of selecting the UI 343 related to recommended counterpart user information displayed on the application screen related to the video call service, for example. If the electronic device receives a user input of selecting the UI 343 related to recommended counterpart user information, for example, the electronic device may display the user's recommended counterpart user information 1010.

In relation to a method for determining recommended counterpart users suitable for the user, the server 120 may receive, from the electronic device 110, the user's information (for example, gender, age, and nationality), information regarding the video time for which the user made video calls in the past, and information regarding video scores that reflect evaluation by counterpart users who made video calls to the user in the past, for example, and may accumulate and store the video time information and the video score information with regard to each user.

The server 120 may determine at least one counterpart user, who has information preferred by the user, as a recommended counterpart user by conducting analysis on the basis of at least one piece of information selected from information regarding the counterpart user, information regarding the video time of the counterpart user, and information regarding the video score of the counterpart user, for example. If the user is a man in his twenties, if his average video time is 3 minutes or longer, and if his average video score is equal to or higher than 4 points and lower than 4.5 points, for example, the server 120 may then determine at least one counterpart user who is a woman in her twenties, whose average video time is 3 minutes or longer, and whose average video score is equal to or higher than 4 points and lower than 4.5 points, as a recommended counterpart user. The server 120 may transmit information regarding the determined recommended counterpart user to the electronic device, for example. The electronic device 110 may display a recommendation screen 1011, including the information regarding the determined recommended counterpart user, in one area of the application screen, for example.

The recommendation screen 1011 may display, for example, the recommended counterpart user's information (for example, gender and age). The recommendation screen 1011 may display a statistical material 1013 regarding the video time for which the recommended counterpart user made video calls in the past, for example. The recommendation screen 1011 may display a statistical material 1015 regarding video scores that reflect evaluation by counterpart users who made video calls to the recommended counterpart user in the past, for example. The recommendation screen 1011 may provide, for example, a UI 1017 for sending a video call request to the recommended counterpart user. If the electronic device receives a user input of selecting the UI 1017 for sending a video call request to the recommended counterpart user, the electronic device may transmit the video call request to the electronic device of the recommended counterpart user.

The recommendation screen 1011 may provide a UI 1021 for displaying information regarding another recommended counterpart user, for example. The recommendation screen may provide a UI 1023 for displaying at least one recommended counterpart user in a thumbnail type, for example.

Embodiments disclosed in the specification and drawings are only specific examples given to easily describe the technical gist of the embodiments and to help understanding of the embodiments, and are not intended to limit the scope of the embodiments. Therefore, it should be construed that, in addition to the embodiments disclosed herein, all modifications and changes or modified and changed forms derived from the technical idea of various embodiments of the disclosure fall within the scope of the disclosure.

What is claimed is:

1. A method for providing a video call service by a server, the method comprising:
 transmitting, to an electronic device, information regarding at least one counterpart user and information regarding whether or not the at least one counterpart user is currently engaged in a video call;
 receiving, from the electronic device, a request for a video call to a specific counterpart user among the at least one counterpart user, and transmitting the received request for a video call to an external electronic device of the specific counterpart user;
 receiving a response to the request for a video call from the external electronic device and transmitting the received response to the electronic device;
 receiving, when it is determined to make the video call, a request for transferring a point related to the video call service to the specific counterpart user from the electronic device while making the video call;
 transmitting information regarding the transferred point to the external electronic device in response to the received request;
 receiving information regarding purchase of a point related to the video call service from the electronic device; and
 transmitting, to the electronic device, information regarding an additional function provided to a user who purchased at least a predetermined point related to the video call service.

2. The method of claim 1, further comprising:
 receiving, after the video call is over, information regarding a video time for which the video call has been made and information regarding a video score given by the user as a result of evaluating the video call, transferred from the electronic device; and
 accumulating and storing the received video time information and video score information in connection with a profile of the specific counterpart user, and calculating an average video time and an average video score of the specific counterpart user by using the accumulated and stored value.

3. The method of claim 2, wherein the at least one counterpart user is determined on the basis of the average video time and the average video score of the counterpart user.

4. A method for providing a video call service by an electronic device, the method comprising:
outputting a screen, when an application related to the video call service is executed, images corresponding to at least one counterpart user and a first indicator indicating whether or not the counterpart user is currently engaged in a video call; receiving a first user input of selecting one of the images corresponding to at least one counterpart user;
transmitting a request for a video call to an external electronic device of a specific counterpart user corresponding to the selected image on the basis of the first user input; receiving a response to the request for a video call;
determining whether or not to make a video call on the basis of the received response;
receiving a first image from the external electronic device when it is determined to make the video call;
acquiring a second image through a camera of the electronic device;
receiving a first user input related to transferring a point related to the video call service to the specific counterpart user while the first image and the second image are output;
transmitting a request for transferring the point to a server in response to reception of the first user input;
transmitting, to the server, information regarding purchase of a point related to the video call service;
receiving, from the server, information regarding an additional function provided to a user who purchased at least a predetermined point related to the video call service; and
outputting a screen that displays an icon related to the additional function, on the basis of the information regarding an additional function.

5. The method of claim 4, further comprising: receiving a second user input of storing, in the electronic device, an image corresponding to a screen on which the first image is displayed, while the first image is output; and
outputting a warning message in response to reception of the second user input.

6. The method of claim 4, wherein the method further comprises inserting a watermark in an area of the screen on which the first image is displayed, while the first image is output, and the watermark is output while continuously moving on the screen on which the first image is displayed.

* * * * *